(12) United States Patent
Huang et al.

(10) Patent No.: US 12,335,187 B2
(45) Date of Patent: Jun. 17, 2025

(54) SOUNDING REFERENCE SIGNAL CONFIGURATION

(71) Applicant: QUALCOMM INCORPORATED, San Diego, CA (US)

(72) Inventors: Min Huang, Beijing (CN); Chao Wei, Beijing (CN); Liangming Wu, Beijing (CN); Chenxi Hao, Beijing (CN); Qiaoyu Li, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/758,295

(22) PCT Filed: Jan. 7, 2021

(86) PCT No.: PCT/CN2021/070606
§ 371 (c)(1),
(2) Date: Jun. 30, 2022

(87) PCT Pub. No.: WO2021/147682
PCT Pub. Date: Jul. 29, 2021

(65) Prior Publication Data
US 2023/0030275 A1 Feb. 2, 2023

(30) Foreign Application Priority Data

Jan. 25, 2020 (WO) ................ PCT/CN2020/074050
Jan. 30, 2020 (WO) ................ PCT/CN2020/074072

(51) Int. Cl.
*H04L 5/00* (2006.01)
*H04B 7/06* (2006.01)

(52) U.S. Cl.
CPC ......... *H04L 5/0051* (2013.01); *H04B 7/0617* (2013.01)

(58) Field of Classification Search
CPC ... H04B 7/0617; H04B 7/0695; H04L 5/0023; H04L 5/0048; H04L 5/0051
See application file for complete search history.

(56) References Cited

U.S. PATENT DOCUMENTS 10,256,893 B2* 4/2019 Bergström ........... H04B 7/0695
10,720,978 B1* 7/2020 Sun ....................... H04L 5/0073
(Continued)

FOREIGN PATENT DOCUMENTS

CN     102273115 A    12/2011
CN     109474313 A     3/2019
(Continued)

OTHER PUBLICATIONS

CMCC: "Enhancements on Multi-Beam Operation", 3GPP TSG RAN WG1 #96bis, R1-1904736, Xi'an, China, Apr. 8-12, 2019, Apr. 12, 2019 (Apr. 12, 2019), Sections 2.2, 3, 6 Pages.
(Continued)

*Primary Examiner* — Dung B Huynh
(74) *Attorney, Agent, or Firm* — Holland & Hart LLP/Qualcomm

(57) ABSTRACT

Methods, systems, and devices for wireless communications are described. The methods, systems, and devices may enable a user equipment (UE) to receive a sounding reference signal (SRS) configuration message that indicates one or more first reference signals from a first node or one or more SRS transmission beams associated with the first node and one or more second reference signals from a second node. The UE may determine an SRS transmission beam for transmitting an SRS signal based on a procedure for determining SRS transmission beams and the one or more reference signals from the first and second nodes. The UE may transmit the SRS signal using the SRS transmission beam.

30 Claims, 24 Drawing Sheets

(56) References Cited

U.S. PATENT DOCUMENTS

| | | | | |
|---|---|---|---|---|
| 10,862,561 | B2* | 12/2020 | Xu | H04L 1/0026 |
| 11,246,149 | B2* | 2/2022 | Lin | H04L 5/0082 |
| 11,356,860 | B2* | 6/2022 | Takano | H04B 7/06 |
| 11,497,030 | B2* | 11/2022 | Liu | H04L 5/0051 |
| 11,711,121 | B2* | 7/2023 | Zhao | H04B 7/088 370/329 |
| 11,838,151 | B1* | 12/2023 | Jones | H04L 25/0224 |
| 12,010,542 | B2* | 6/2024 | Matsumura | H04W 16/28 |
| 2011/0158190 | A1* | 6/2011 | Kuwahara | H04L 5/0062 370/329 |
| 2011/0306381 | A1* | 12/2011 | Jia | H04W 52/40 455/114.2 |
| 2013/0102345 | A1* | 4/2013 | Jung | H04B 7/0617 455/513 |
| 2014/0148182 | A1* | 5/2014 | Jeong | H04J 13/0048 455/452.1 |
| 2015/0257073 | A1* | 9/2015 | Park | H04L 5/0048 370/331 |
| 2017/0149480 | A1* | 5/2017 | Kakishima | H04B 7/024 |
| 2017/0230910 | A1* | 8/2017 | Kimura | H04B 7/0695 |
| 2017/0311252 | A1* | 10/2017 | Takano | H04W 48/20 |
| 2017/0317866 | A1* | 11/2017 | Stirling-Gallacher | H04B 7/088 |
| 2017/0366981 | A1* | 12/2017 | Takano | H04B 7/0469 |
| 2018/0042000 | A1* | 2/2018 | Zhang | H04W 72/23 |
| 2018/0097548 | A1* | 4/2018 | Kim | H04B 7/0478 |
| 2018/0124724 | A1* | 5/2018 | Tsai | H04W 56/0045 |
| 2018/0124796 | A1* | 5/2018 | Noh | H04B 1/1027 |
| 2018/0248608 | A1* | 8/2018 | Akoum | H04B 7/0639 |
| 2018/0254809 | A1* | 9/2018 | Huang | H04J 11/0053 |
| 2018/0279145 | A1* | 9/2018 | Jung | H04L 5/0051 |
| 2018/0302888 | A1* | 10/2018 | Stirling-Gallacher | H04B 7/063 |
| 2018/0331747 | A1* | 11/2018 | Kakishima | H04B 7/0626 |
| 2018/0343043 | A1* | 11/2018 | Hakola | H04B 7/0417 |
| 2019/0053234 | A1 | 2/2019 | Cui et al. | |
| 2019/0098638 | A1* | 3/2019 | Kakishima | H04L 5/0094 |
| 2019/0158166 | A1* | 5/2019 | Takano | H04W 76/25 |
| 2019/0159054 | A1* | 5/2019 | Yiu | H04B 7/088 |
| 2019/0190582 | A1 | 6/2019 | Guo et al. | |
| 2019/0190747 | A1* | 6/2019 | Park | H04L 5/0057 |
| 2019/0199496 | A1* | 6/2019 | Qin | H04W 16/28 |
| 2019/0223043 | A1* | 7/2019 | Geng | H04L 5/0051 |
| 2019/0238282 | A1* | 8/2019 | Cao | H04J 11/00 |
| 2019/0238287 | A1* | 8/2019 | Zhou | H04W 52/143 |
| 2019/0246434 | A1* | 8/2019 | Tang | H04W 88/023 |
| 2019/0273583 | A1* | 9/2019 | Ugurlu | H04W 24/10 |
| 2019/0280757 | A1 | 9/2019 | Yang et al. | |
| 2019/0320336 | A1* | 10/2019 | Takano | H04W 16/28 |
| 2019/0349864 | A1* | 11/2019 | Zhang | H04W 52/325 |
| 2019/0364445 | A1* | 11/2019 | Kang | H04W 24/04 |
| 2019/0379502 | A1* | 12/2019 | Kakishima | H04B 7/0619 |
| 2020/0007196 | A1* | 1/2020 | Cao | H04B 7/0617 |
| 2020/0007292 | A1* | 1/2020 | Huang | H04W 72/542 |
| 2020/0014515 | A1* | 1/2020 | Qin | H04L 5/0051 |
| 2020/0022126 | A1* | 1/2020 | You | H04W 76/27 |
| 2020/0028599 | A1* | 1/2020 | Zhang | H04B 7/088 |
| 2020/0037385 | A1* | 1/2020 | Park | H04W 76/19 |
| 2020/0052802 | A1* | 2/2020 | Ryu | H04W 52/242 |
| 2020/0059867 | A1* | 2/2020 | Haghighat | H04W 52/367 |
| 2020/0059898 | A1* | 2/2020 | Osawa | H04W 72/02 |
| 2020/0067739 | A1* | 2/2020 | Tang | H04L 25/0226 |
| 2020/0092059 | A1* | 3/2020 | Zhu | H04L 5/0053 |
| 2020/0106647 | A1* | 4/2020 | Chen | H04W 72/04 |
| 2020/0120531 | A1* | 4/2020 | Qin | H04B 7/0695 |
| 2020/0136708 | A1* | 4/2020 | Pan | H04B 7/0408 |
| 2020/0136711 | A1* | 4/2020 | Cao | H04B 7/0626 |
| 2020/0154297 | A1* | 5/2020 | Chen | H04W 24/10 |
| 2020/0177416 | A1* | 6/2020 | Jiang | H04L 5/0091 |
| 2020/0187128 | A1* | 6/2020 | Yao | H04W 52/242 |
| 2020/0205093 | A1* | 6/2020 | Kim | H04W 52/42 |
| 2020/0221405 | A1* | 7/2020 | Zarifi | H04W 52/50 |
| 2020/0235832 | A1* | 7/2020 | Lee | H04L 27/2602 |
| 2020/0305087 | A1* | 9/2020 | Nilsson | H04W 52/245 |
| 2020/0322940 | A1* | 10/2020 | Pezeshki | H04B 7/063 |
| 2020/0344614 | A1* | 10/2020 | Takano | H04B 17/345 |
| 2020/0359404 | A1* | 11/2020 | Nilsson | H04B 7/088 |
| 2020/0366359 | A1* | 11/2020 | Nilsson | H04W 52/42 |
| 2020/0367175 | A1* | 11/2020 | Fukui | H04W 24/08 |
| 2020/0383060 | A1* | 12/2020 | Park | H04W 52/242 |
| 2020/0396012 | A1* | 12/2020 | Liu | H04B 17/382 |
| 2021/0036754 | A1* | 2/2021 | Bengtsson | H04B 7/0695 |
| 2021/0076395 | A1* | 3/2021 | Zhou | H04L 27/26025 |
| 2021/0092001 | A1* | 3/2021 | Yoshioka | H04B 7/088 |
| 2021/0111928 | A1* | 4/2021 | Zhang | H04B 7/0408 |
| 2021/0135741 | A1* | 5/2021 | Zhou | H04B 7/088 |
| 2021/0136639 | A1* | 5/2021 | Osawa | H04B 7/0408 |
| 2021/0152397 | A1* | 5/2021 | Jiang | H04L 5/0048 |
| 2021/0160706 | A1* | 5/2021 | Wu | H04W 16/28 |
| 2021/0167821 | A1* | 6/2021 | Chen | H04B 7/0617 |
| 2021/0204229 | A1* | 7/2021 | Miao | H04W 52/365 |
| 2021/0211176 | A1* | 7/2021 | Gao | H04B 7/0626 |
| 2021/0211329 | A1* | 7/2021 | Wu | H04L 25/0226 |
| 2021/0211957 | A1* | 7/2021 | Kamohara | H04W 36/06 |
| 2021/0226682 | A1* | 7/2021 | Park | H04L 5/005 |
| 2021/0258894 | A1* | 8/2021 | Yao | H04W 52/50 |
| 2021/0281314 | A1* | 9/2021 | Zander | H04B 7/0404 |
| 2021/0288696 | A1* | 9/2021 | Jung | H04B 7/024 |
| 2021/0297135 | A1* | 9/2021 | Kim | H04B 7/0626 |
| 2021/0306895 | A1* | 9/2021 | Chen | G01S 5/0236 |
| 2021/0336712 | A1* | 10/2021 | Yang | H04L 5/0091 |
| 2021/0345141 | A1* | 11/2021 | Cao | H04W 24/10 |
| 2021/0352613 | A1* | 11/2021 | Yoon | H04L 5/0092 |
| 2021/0360649 | A1* | 11/2021 | Athley | H04W 72/542 |
| 2021/0376894 | A1* | 12/2021 | Cha | H04B 7/0695 |
| 2021/0377774 | A1* | 12/2021 | Yu | H04B 7/024 |
| 2021/0385757 | A1* | 12/2021 | Zhang | H04B 7/0695 |
| 2021/0399821 | A1* | 12/2021 | Chung | H04L 5/14 |
| 2021/0399855 | A1* | 12/2021 | Davydov | H04L 5/0023 |
| 2021/0400510 | A1* | 12/2021 | Sha | H04W 24/10 |
| 2021/0400677 | A1* | 12/2021 | Lee | H04L 5/005 |
| 2021/0410081 | A1* | 12/2021 | Xu | H04J 11/0056 |
| 2022/0022053 | A1* | 1/2022 | Kakishima | H04B 7/06966 |
| 2022/0030527 | A1* | 1/2022 | Kim | H04W 52/146 |
| 2022/0060265 | A1* | 2/2022 | Xu | H04L 5/0094 |
| 2022/0094498 | A1* | 3/2022 | Liu | H04W 72/541 |
| 2022/0095265 | A1* | 3/2022 | Cha | H04W 64/006 |
| 2022/0109483 | A1* | 4/2022 | Nilsson | H04B 7/0695 |
| 2022/0123815 | A1* | 4/2022 | Karjalainen | H04B 17/309 |
| 2022/0149921 | A1* | 5/2022 | Nilsson | H04B 7/0695 |
| 2022/0158715 | A1* | 5/2022 | Bishwarup | H04W 76/19 |
| 2022/0167335 | A1* | 5/2022 | Go | H04W 52/146 |
| 2022/0190977 | A1* | 6/2022 | Lee | H04B 17/336 |
| 2022/0216906 | A1* | 7/2022 | Liu | H04B 7/024 |
| 2022/0248419 | A1* | 8/2022 | Nilsson | H04W 72/0446 |
| 2022/0264318 | A1* | 8/2022 | Nilsson | H04B 7/0452 |
| 2022/0264343 | A1* | 8/2022 | Guo | H04W 24/08 |
| 2022/0264561 | A1* | 8/2022 | Fan | H04B 7/0695 |
| 2022/0264584 | A1* | 8/2022 | Fan | H04L 5/0051 |
| 2022/0286185 | A1* | 9/2022 | Zhang | H04B 7/0695 |
| 2022/0303108 | A1* | 9/2022 | Faxér | H04L 5/1461 |
| 2022/0345191 | A1* | 10/2022 | Guo | H04B 7/0686 |
| 2022/0376768 | A1* | 11/2022 | Harrebek | H04B 7/088 |
| 2022/0408446 | A1* | 12/2022 | Zirwas | H04W 24/08 |
| 2023/0009770 | A1* | 1/2023 | Li | H04B 17/327 |
| 2023/0058303 | A1* | 2/2023 | Matsumura | H04B 7/06968 |
| 2023/0083208 | A1* | 3/2023 | Zhang | H04B 7/0695 370/329 |
| 2023/0188285 | A1* | 6/2023 | Wang | H04B 7/088 |
| 2023/0208490 | A1* | 6/2023 | Kim | H04L 5/0051 370/329 |
| 2024/0032036 | A1* | 1/2024 | Farag | H04B 7/088 |

FOREIGN PATENT DOCUMENTS

| | | |
|---|---|---|
| CN | 110268637 A | 9/2019 |
| CN | 110475360 A | 11/2019 |
| CN | 110536423 A | 12/2019 |
| CN | 110637495 A | 12/2019 |
| WO | WO-2017185979 A1 | 11/2017 |
| WO | WO-2018144916 A1 | 8/2018 |

(56) References Cited

FOREIGN PATENT DOCUMENTS

| WO | WO-2019124983 A1 | 6/2019 |
| WO | WO-2019195528 A1 | 10/2019 |
| WO | WO-2019197044 A1 | 10/2019 |

OTHER PUBLICATIONS

International Search Report and Written Opinion—PCT/CN2020/074072—ISA/EPO—Sep. 28, 2020.
International Search Report and Written Opinion—PCT/CN2021/070606—ISA/EPO—Mar. 29, 2021.
Supplementary European Search Report—EP21743688—Search Authority—Munich—Feb. 1, 2024.

* cited by examiner

SOUNDING REFERENCE SIGNAL CONFIGURATION

CROSS-REFERENCE

The present Application is a 371 national stage filing of International PCT Application No. PCT/CN2021/070606 by HUANG et al. entitled "SOUNDING REFERENCE SIGNAL CONFIGURATION," filed Jan. 7, 2021; and claims priority to International Patent Application No. PCT/CN2020/074072 by HUANG et al. entitled "SOUNDING REFERENCE SIGNAL CONFIGURATION," filed Jan. 30, 2020 and International Patent Application No. PCT/CN2020/074050 by HUANG et al. entitled "INTERFERENCE-BASED SOUNDING REFERENCE SIGNAL BEAM DETERMINATION," filed Jan. 25, 2020, each of which is assigned to the assignee hereof, and each of which is expressly incorporated by reference in its entirety herein.

FIELD OF TECHNOLOGY

The following relates generally to wireless communications and more specifically to sounding reference signal (SRS) configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a base station may schedule a UE to transmit an uplink signal to a target transmission and reception point (TRP). However, in some examples, the uplink signal may interfere with an uplink signal from a different UE, which may result in delays, inefficient communications, and relatively high signaling overhead.

SUMMARY

The described techniques relate to improved methods, systems, devices, and apparatuses that support sounding reference signal (SRS) configuration. Generally, the described techniques enable a user equipment (UE) to receive reference signals from a target transmission and reception point (TRP) and from non-target TRPs and determine a transmission beam based on an SRS resource configuration message from a base station and the reference signals. The UE may transmit an SRS signal along with the determined transmission beam to the base station. The base station may schedule the UE for uplink data channel transmissions based on the SRS signal. The base station and UE may communicate according to the uplink data channel, which may result in reduced interference and latency at the UE, among other benefits.

A method of wireless communications at a UE is described. The method may include receiving an SRS configuration message that indicates one or more first reference signals from a first node or one or more SRS transmission beams associated with the first node and one or more second reference signals from a second node, determining an SRS transmission beam for transmitting an SRS signal based on a procedure for determining the SRS transmission beam, the one or more first reference signals, and the one or more second reference signals, and transmitting the SRS signal using the SRS transmission beam.

An apparatus for wireless communications at a UE is described. The apparatus may include a processor, memory coupled with the processor, and instructions stored in the memory. The instructions may be executable by the processor to cause the apparatus to receive an SRS configuration message that indicates one or more first reference signals from a first node or one or more SRS transmission beams associated with the first node and one or more second reference signals from a second node, determine an SRS transmission beam for transmitting an SRS signal based on a procedure for determining the SRS transmission beam, the one or more first reference signals, and the one or more second reference signals, and transmit the SRS signal using the SRS transmission beam.

Another apparatus for wireless communications at a UE is described. The apparatus may include means for receiving an SRS configuration message that indicates one or more first reference signals from a first node or one or more SRS transmission beams associated with the first node and one or more second reference signals from a second node, determining an SRS transmission beam for transmitting an SRS signal based on a procedure for determining the SRS transmission beam, the one or more first reference signals, and the one or more second reference signals, and transmitting the SRS signal using the SRS transmission beam.

A non-transitory computer-readable medium storing code for wireless communications at a UE is described. The code may include instructions executable by a processor to receive an SRS configuration message that indicates one or more first reference signals from a first node or one or more SRS transmission beams associated with the first node and one or more second reference signals from a second node, determine an SRS transmission beam for transmitting an SRS signal based on a procedure for determining the SRS transmission beam, the one or more first reference signals, and the one or more second reference signals, and transmit the SRS signal using the SRS transmission beam.

Some examples of the method, apparatuses, and non-transitory computer-readable medium described herein may further include operations, features, means, or instructions for receiving an indication of the procedure for determining the SRS transmission beam.

In some examples of the method, apparatuses, and non-transitory computer-readable medium described herein, the procedure for determining the sounding reference signal transmission beam may include operations, features, means, or instructions for determining that the SRS transmission beam maximizes an uplink channel gain on an uplink channel between the UE and the first node and generates zero interference on an uplink channel between the UE and the second node.

Some examples of the method, apparatuses, and non-transitory computer-readable medium described herein may further include operations, features, means, or instructions for determining the uplink channel gain on the uplink channel between the UE and the first node based on the one or more first reference signals.

Some examples of the method, apparatuses, and non-transitory computer-readable medium described herein may further include operations, features, means, or instructions for determining an interference on the uplink channel between the UE and the second node based on the one or more second reference signals.

In some examples of the method, apparatuses, and non-transitory computer-readable medium described herein, the procedure for determining the SRS transmission beam may include operations, features, means, or instructions for determining that the SRS transmission beam maximizes a ratio of an uplink channel gain on an uplink channel between the UE and the first node and an interference on an uplink channel between the UE and the second node.

Some examples of the method, apparatuses, and non-transitory computer-readable medium described herein may further include operations, features, means, or instructions for identifying a transmission power of the one or more first reference signals and a transmission power of the one or more second reference signals.

Some examples of the method, apparatuses, and non-transitory computer-readable medium described herein may further include operations, features, means, or instructions for identifying an absolute value of the transmission power of the one or more first reference signals and an absolute value of the one or more second reference signals.

Some examples of the method, apparatuses, and non-transitory computer-readable medium described herein may further include operations, features, means, or instructions for identifying a relationship between the transmission power of the one or more first reference signals and the transmission power of the one or more second reference signals.

Some examples of the method, apparatuses, and non-transitory computer-readable medium described herein may further include operations, features, means, or instructions for receiving an indication of the transmission power of the one or more first reference signals and the transmission power of the one or more second reference signals.

In some examples of the method, apparatuses, and non-transitory computer-readable medium described herein, the SRS configuration message indicates an identity of a resource associated with the one or more first reference signals, the one or more second reference signals, or both.

In some examples of the method, apparatuses, and non-transitory computer-readable medium described herein, the SRS configuration message may be received via radio resource control (RRC) signaling, a medium access control layer control element (MAC-CE), a downlink control information (DCI) message, or a combination thereof.

In some examples of the method, apparatuses, and non-transitory computer-readable medium described herein, the one or more first reference signals or the one or more second reference signals include channel state information (CSI) reference signals, synchronization signal block (SSB) reference signals, demodulation reference signals (DMRSs), or a combination thereof.

Some examples of the method, apparatuses, and non-transitory computer-readable medium described herein may further include operations, features, means, or instructions for receiving the one or more first reference signals from the first node, and receiving the one or more second reference signals from the second node.

Some examples of the method, apparatuses, and non-transitory computer-readable medium described herein may further include operations, features, means, or instructions for sweeping a set of candidate reception beams to receive the one or more first reference signals and the one or more second reference signals.

Some examples of the method, apparatuses, and non-transitory computer-readable medium described herein may further include operations, features, means, or instructions for determining a first uplink channel response matrix for the first node based on the one or more reference signals and a second uplink channel response matrix for the second node based on the one or more second reference signals, determining an orthogonal projection matrix of the second uplink channel response matrix, determining a projected matrix based on a projection of the first uplink channel response matrix onto the orthogonal projection matrix, and calculating a major eigen vector of the projected matrix as a beamforming weight vector of the SRS transmission beam.

In some examples of the method, apparatuses, and non-transitory computer-readable medium described herein, the first node includes a target node with respect to the UE, and the second node includes a non-target node with respect to the UE.

Some examples of the method, apparatuses, and non-transitory computer-readable medium described herein may further include operations, features, means, or instructions for receiving an uplink scheduling grant that may be based on the transmitted SRS signal.

In some examples of the method, apparatuses, and non-transitory computer-readable medium described herein, where the other SRS resource may be associated with one or more SRS ports and where each of the one or more SRS ports may be associated with a respective SRS transmission beam of the one or more SRS transmission beams.

Some examples of the method, apparatuses, and non-transitory computer-readable medium described herein may further include operations, features, means, or instructions for determining respective sets of beamforming weights for each of the one or more SRS transmission beams, generating a reference SRS transmission beam of the one or more SRS transmission beams based on, a set of beamforming weights for the reference SRS transmission beam, and an SRS port associated with the reference SRS transmission beam.

In some examples of the method, apparatuses, and non-transitory computer-readable medium described herein, determining the SRS transmission beam may include operations, features, means, or instructions for determining the SRS transmission beam based on one or more SRS transmission beam parameters.

In some examples of the method, apparatuses, and non-transitory computer-readable medium described herein, a first parameter indicating that a beam correlation between the SRS transmission beam and a reference SRS transmission beam of the one or more SRS transmission beams may be to satisfy a beam correlation threshold and a second parameter indicating that the SRS transmission beam may be to generate zero interference strength on access links associated with one or more non-target TRPs.

In some examples of the method, apparatuses, and non-transitory computer-readable medium described herein, a first parameter indicating that a beam correlation between the SRS transmission beam and a reference SRS transmission beam of the one or more SRS transmission beams may be to satisfy a beam correlation threshold and a second parameter indicating an interference strength of the SRS transmission beam for access links associated with one or more non-target TRPs that satisfies an interference strength threshold.

In some examples of the method, apparatuses, and non-transitory computer-readable medium described herein, determining the SRS transmission beam may include operations, features, means, or instructions for determining respective correlation coefficients between one or more reference SRS transmission beams and the one or more SRS transmission beams, determining one or more downlink beams based on the one or more reference SRS transmission beams, sweeping the one or more downlink beams to receive one or more reference signals, determining respective beamformed downlink channel gains for each of the one or more downlink beams based on the one or more reference signals, determining respective uplink interference strengths for the one or more reference SRS transmission beams based on, the respective beamformed downlink channel gains, reciprocity between the one or more reference SRS transmission beams and the one or more downlink beams, and determining the SRS transmission beam based on the respective uplink interference strengths and the respective correlation coefficients.

A method of wireless communications at a base station is described. The method may include transmitting an SRS configuration message that indicates one or more first reference signals from a first node or one or more SRS transmission beams associated with the first node and one or more second reference signals from a second node and receiving, from a UE, an SRS signal using an SRS transmission beam that is based on a procedure for determining the SRS transmission beam, the one or more first reference signals, and the one or more second reference signals.

An apparatus for wireless communications at a base station is described. The apparatus may include a processor, a memory coupled with the processor, and instructions stored in the memory. The instructions may be executable by the processor to cause the apparatus to transmit an SRS configuration message that indicates one or more first reference signals from a first node or one or more SRS transmission beams associated with the first node and one or more second reference signals from a second node and receive, from a UE, an SRS signal using an SRS transmission beam that is based on a procedure for determining the SRS transmission beam, the one or more first reference signals, and the one or more second reference signals.

Another apparatus for wireless communications at a base station is described. The apparatus may include means for transmitting an SRS configuration message that indicates one or more first reference signals from a first node or one or more SRS transmission beams associated with the first node and one or more second reference signals from a second node and receiving, from a UE, an SRS signal using an SRS transmission beam that is based on a procedure for determining the SRS transmission beam, the one or more first reference signals, and the one or more second reference signals.

A non-transitory computer-readable medium storing code for wireless communications at a base station is described. The code may include instructions executable by a processor to transmit an SRS configuration message that indicates one or more first reference signals from a first node or one or more SRS transmission beams associated with the first node and one or more second reference signals from a second node and receive, from a UE, an SRS signal using an SRS transmission beam that is based on a procedure for determining the SRS transmission beam, the one or more first reference signals, and the one or more second reference signals.

Some examples of the method, apparatuses, and non-transitory computer-readable medium described herein may further include operations, features, means, or instructions for transmitting an indication of the procedure for determining the SRS transmission beam.

In some examples of the method, apparatuses, and non-transitory computer-readable medium described herein, the procedure for determining the sounding reference signal transmission beam may include operations, features, means, or instructions for determining that the SRS transmission beam maximizes an uplink channel gain on an uplink channel between the UE and the first node and generates zero interference on an uplink channel between the UE and the second node.

In some examples of the method, apparatuses, and non-transitory computer-readable medium described herein, the procedure for determining the SRS transmission beam may include operations, features, means, or instructions for determining that the SRS transmission beam maximizes a ratio of an uplink channel gain on an uplink channel between the UE and the first node and an interference on an uplink channel between the UE and the second node.

Some examples of the method, apparatuses, and non-transitory computer-readable medium described herein may further include operations, features, means, or instructions for transmitting an indication of a transmission power of the one or more first reference signals and a transmission power of the one or more second reference signals.

In some examples of the method, apparatuses, and non-transitory computer-readable medium described herein, the SRS configuration message indicates an identity of a resource associated with the one or more first reference signals, the one or more second reference signals, or both.

In some examples of the method, apparatuses, and non-transitory computer-readable medium described herein, the SRS configuration message may be transmitted via RRC signaling, a MAC-CE, a DCI message, or a combination thereof.

In some examples of the method, apparatuses, and non-transitory computer-readable medium described herein, the one or more first reference signals or the one or more second reference signals include CSI reference signals, SSB reference signals, DMRSs, or a combination thereof.

Some examples of the method, apparatuses, and non-transitory computer-readable medium described herein may further include operations, features, means, or instructions for transmitting an uplink scheduling grant that may be based on the SRS signal.

In some examples of the method, apparatuses, and non-transitory computer-readable medium described herein, where the other SRS resource may be associated with one or more SRS ports and where each of the one or more SRS ports may be associated with a respective SRS transmission beam of the one or more SRS transmission beams.

Some examples of the method, apparatuses, and non-transitory computer-readable medium described herein may further include operations, features, means, or instructions for determining the SRS transmission beam based on one or more SRS transmission beam parameters.

DETAILED DESCRIPTION

Figure 1:
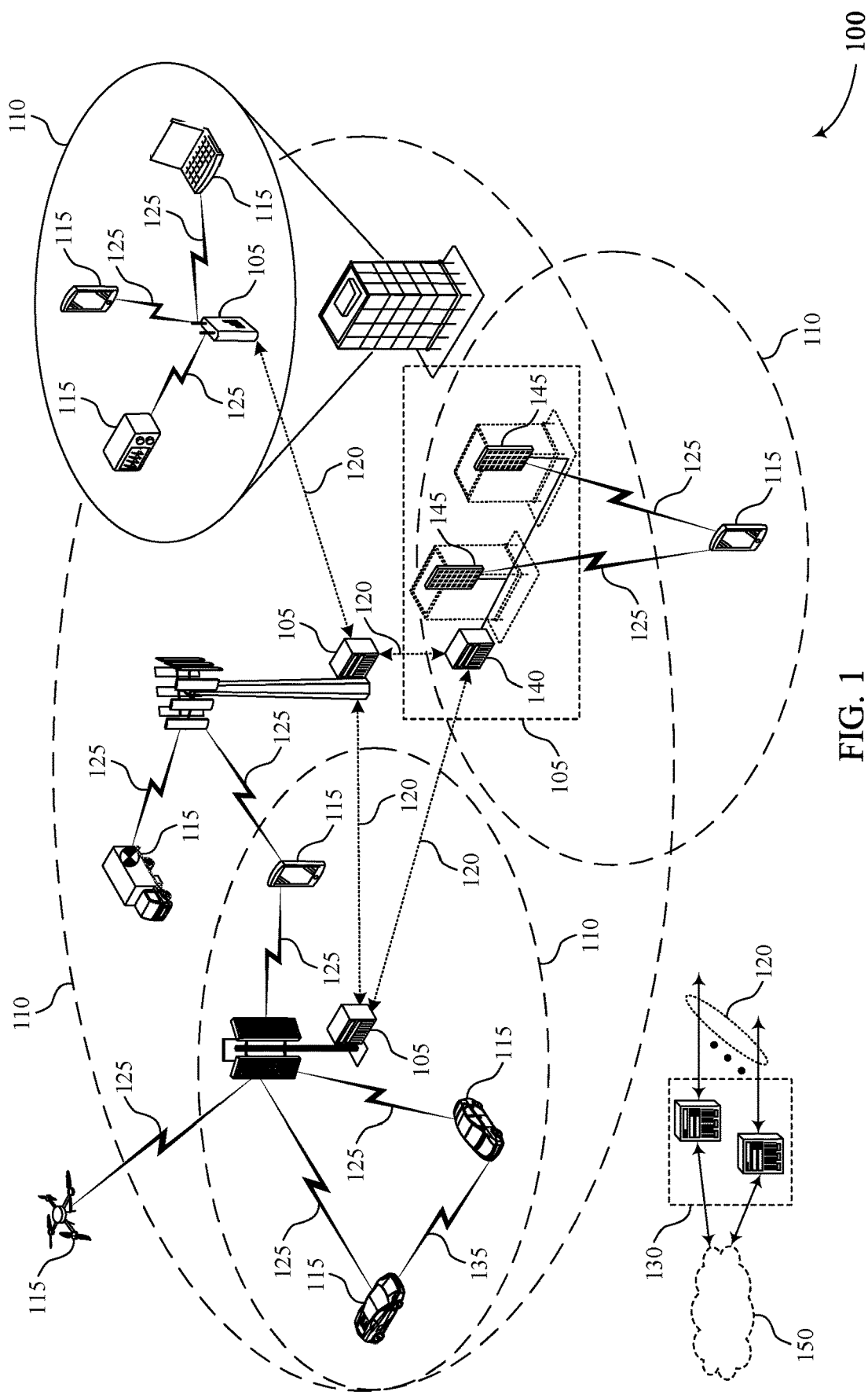
FIGS. 1 and 2 illustrate examples of wireless communications systems that support sounding reference signal (SRS) configuration in accordance with aspects of the present disclosure.

In some wireless communication systems, a base station may schedule a user equipment (UE) to transmit an uplink data channel signal to a target transmission and reception point (TRP) with the highest channel gain. For example, the UE may have a determined transmission power. Therefore, in a multi-TRP scenario, the UE may select a target TRP with a relatively high channel gain in order to transmit with full transmission power. In some cases, a base station may schedule one or more UEs to transmit in an uplink data channel (e.g., physical uplink shared channel (PUSCH)) to different TRPs using the same time-frequency resource to improve spectrum efficiency and the cell throughput. However, if multiple UEs transmit uplink signals to TRPs using the same time-frequency resource without beam coordination, the signals may interfere, resulting in latency and high signaling overhead (e.g., due to retransmitting the signals).

Accordingly, the techniques described herein may enable a base station to transmit a sounding reference signal (SRS) configuration message to a UE. The SRS configuration message may indicate one or more reference signals associated with TRPs. In some cases, the UE may receive one or more first reference signals from a target TRP and a number of other reference signals from one or more non-target TRPs. In some examples, the UE may be configured with a procedure for determining an SRS transmission beam based on the reference signals from the target TRP and one or more reference signals from the non-target TRPs. In some other examples, the base station may transmit an indication of a procedure for determining the SRS transmission beam (e.g., including criterion associated with the SRS transmission beam). The UE may determine the SRS transmission beam based on the procedure and the received one or more reference signals. For example, the UE may select an SRS transmission beam based on maximizing an uplink channel gain between the UE and the target TRP while creating zero interference on an uplink channel between the UE and a non-target TRP. In some other examples, the UE may select an SRS transmission beam based on maximizing a ratio of an uplink channel gain between the UE and the target TRP and the interference on the uplink channel between the UE and the non-target TRP.

The UE may transmit an SRS signal to the base station. The base station may determine scheduling for the UE in an uplink data channel (e.g., PUSCH) based on the received SRS signal, then may send an uplink scheduling grant to the UE. The UE may transmit a signal in the uplink data channel based on the received scheduling grant and the determined transmission beam, which may enable the UE to communicate via a target TRP without creating interference for other UEs transmitting uplink signals to TRPs using the same time-frequency resource.

Aspects of the disclosure are initially described in the context of wireless communications systems. Additional aspects of the disclosure are described with reference to process flows. Aspects of the disclosure are further illustrated by and described with reference to apparatus diagrams, system diagrams, and flowcharts that relate to SRS configuration.

FIG. 1 illustrates an example of a wireless communications system 100 that supports SRS configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In some other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other cases, the device may provide HARQ feedback in a subsequent slot, or according to some other time interval.

A UE 115 may receive an SRS configuration message that indicates one or more first reference signals from a first access network transmission entity 145 (e.g., a first TRP) and one or more second reference signals from a second access network transmission entity 145 (e.g., a second TRP). The UE 115 may determine an SRS transmission beam for transmitting an SRS signal based on a procedure for determining SRS transmission beams and the one or more reference signals from the first and second access network transmission entities 145. The UE 115 may transmit an SRS signal using the SRS transmission beam. A base station 105 may receive the SRS signal and transmit an uplink scheduling grant based on the message. The UE 115 and base station 105 may communicate according to the uplink scheduling grant.

Figure 2:
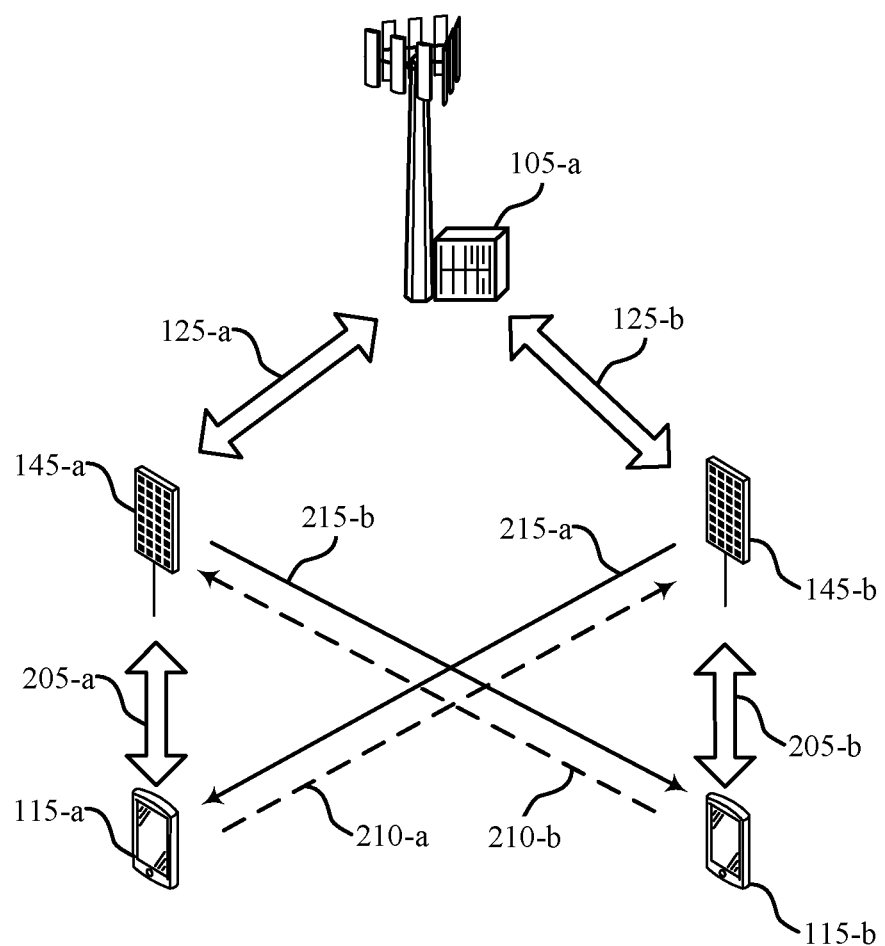

FIG. 2 illustrates an example of a wireless communications system 200 that supports SRS configuration in accordance with aspects of the present disclosure. In some examples, wireless communications system 200 may implement aspects of wireless communications system 100 and may include UE 115-a, UE 115-b, base station 105-a, TRP 145-a, and TRP 145-b, which may be examples of UEs 115, a base station 105, and TRPs 145 described with reference to FIG. 1. As described herein, base station 105-a may configure UE 115-a and UE 115-b with an SRS configuration to reduce interference.

In some examples, a base station 105 may communicate with one or more UEs 115 using one or more TRPs 145. For example, base station 105-a may communicate with UE 115-a and UE 115-b using TRP 145-a and TRP 145-b via communication link 125-a and communication link 125-b respectively. The one or more TRPs 145 may be geographically concentrated or distributed within a coverage area of the base station 105. The base station 105 may transmit the signal using multiple channel links (e.g., physical downlink shared channel (PDSCH) links) to enhance the diversity gain, downlink system capacity, downlink cell coverage, or a combination thereof. In some cases, a TRP 145 may jointly communicate with one or more UEs 115. In some other cases, the TRP 145 may communicate with one or more UEs 115 separately.

In some cases, a base station 105 may receive an uplink data channel signal from a UE 115 via a target TRP 145. For example, base station 105-a may receive a PUSCH signal from UE 115-a through target TRP 145-a. In some cases, the link between the UE 115 and the target TRP 145 may be referred to as a target link 205. In uplink, the UE 115 may use a channel gain to determine the target TRP 145. For example, UE 115-a may transmit a signal to base station 105-a via target TRP 145-a using full transmission power based on determining TRP 145-a has the highest channel gain. In some cases, the base station 105 may schedule a UE 115 to transmit in the uplink data channel to a TRP 145 at the same time-frequency resource as a different UE 115 is transmitting to a different TRP 145 to improve the spectrum efficiency and base station 105 throughput. For example, base station 105-a may schedule UE 115-a to transmit to TRP 145-a at the same time-frequency resource as UE 115-b is transmitting to TRP 145-b. However, if two UEs 115-a and 115-b transmit uplink signals to two TRPs 145-a and 145-b without beam coordination, the transmitted signals may interfere via an interference link 210. The interference may cause unreliable signal reception.

In some cases, the base station 105 may design a configuration that allows for feedback from a UE 115 (e.g., channel state information (CSI) feedback) when there are multiple TRPs 145. For example, the base station 105 may use one or more SRSs from the UE 115 (e.g., UE 115-a or UE 115-b) to determine an uplink beam (e.g., beam direction, beam weight, or both) and uplink scheduling (e.g., resource assignment, transport format, modulation and coding scheme (MCS), number of layers, or a combination) for the UE 115. For example, the base station 105 may determine one or more uplink beams based on the channel gains of the one or more SRSs (e.g., selecting the beams of the SRSs with the highest channel gains). In some cases, the base station 105 may indicate the uplink beams to the UE 115 in an uplink data channel scheduling grant (e.g., downlink control information (DCI) format 0_1), and the UE 115 may transmit an uplink data channel (e.g., PUSCH) along the beams.

In some cases, a base station 105 may configure SRS resources of a UE 115 using RRC signaling. For example, each SRS resource may include an attribute (e.g., spatial relation information (spatialRelationInfo)), which is associated with a resource of a reference signal. If the base station 105 indicates to the UE 115 to transmit an SRS in an SRS resource, the UE 115 may use the beam that corresponds to the reference signal. For example, if the resource of the reference signal is a synchronization signal block (SSB) index (ssb-Index) or a CSI-RS index (csi-RS-Index), the UE 115 may transmit the SRS along the beam that may be used to receive SSB or CSI-RS in the corresponding SSB or CSI-RS resource. In some examples, if the resource of the reference signal is an SRS resource (srs), the UE 115 may transmit the SRS along the beam that may be used to transmit SRS in the corresponding SRS resource.

In some cases, the base station 105 may configure a UE 115 with an SRS spatial relation configuration, which may be associated with the channel gain of a target link 205 to a target TRP 145 based on a configured reference signal. If the base station 105 accounts for the channel gain, but ignores the interference in interference links 210 to non-target TRPs 145, the UE 115 may transmit an uplink data channel signal along with the beam of an SRS that enhances the target link 205 but may cause interference to the interference link 210. In some cases, the interference may weaken reception performance (e.g., by lowering a signal to interference plus noise ratio (SINR)) of a different uplink data channel signal to different non-target TRPs 145 at the same time-frequency resource.

To improve signal reception, a base station 105 may configure one or more UEs 115 with an SRS spatial relation configuration (e.g., an SRS configuration) based on one or more reference signals from one or more TRPs. For example, base station 105-*a* may configure UE 115-*a* or UE 115-*b* with an SRS spatial relation configuration based on reference signals from TRP 145-*a* and TRP 145-*b* received via non-target links 215. Thus, UE 115-*a* and UE 115-*b* may determine an uplink beam that enhances the channel gain to target link 205-*a* and target link 205-*b* respectively, while reducing the interference to the interference link 210-*a* and interference link 210-*b*. For example, the base station 105 may transmit an SRS resource configuration message to a UE 115, the message indicating a procedure for determining the SRS transmission beam. The resource configuration message may include criterion associated with a first reference signal (e.g., CSI-RS or SSB) from a target TRP 145 and one or more subsequent reference signals from one or more non-target TRPs 145.

In some cases, UE 115-*a* may receive an SRS resource configuration message from base station 105-*a* via target TRP 145-*a* (e.g., through communication link 125-*a* and target link 205-*a*). Additionally, UE 115-*a* may receive one or more reference signals from target TRP 145-*a* (e.g., via target link 205-*a*) and non-target TRP 145-*b* (e.g., via non-target link 215-*a*). In some examples, UE 115-*a* may sweep candidate reception beams to receive the reference signals. UE 115-*a* may determine a transmission beam (e.g., an SRS transmission beam in the SRS resource) based on the reference signals and a procedure specified by base station 105-*a* in the SRS resource configuration message. UE 115-*a* may transmit an SRS signal along with the determined transmission beam to base station 105-*a* using target link 205-*a*. In some cases, base station 105-*a* may schedule UE 115-*a* in the uplink data channel based on the received SRS. Base station 105-*a* may transmit an uplink scheduling grant to UE 115-*a* via TRP 145-*a* and target link 205-*a*. UE 115-*a* may transmit in the uplink data channel based on the scheduling grant and determined transmission beam. Thus, by using a procedure for determining the SRS transmission beam (e.g., including a beam determination criterion) and reference signals from TRP 145-*a* and TRP 145-*b*, UE 115-*a* may transmit to base station 105-*a* without causing interference, or at least reducing interference, along interference link 210-*a*.

In some cases, the beam determination procedure may involve improving a beamformed channel gain of a target link 205 and weakening a beamformed interference of an interference link 210. For example, UE 115-*a* may select a beam that maximizes the beamformed uplink channel gain of target link 205-*a*, while generating zero interference on interference link 210-*a*. In some cases, UE 115-*a* may determine the beamformed uplink channel gain of target link 205-*a* by using the downlink reference signal from target TRP 145-*a* (e.g., of target link 205-*a*) based on downlink-uplink channel reciprocity. In some other cases, UE 115-*a* may determine that the beamformed uplink interference strength of interference link 210-*a* is similar to, or the same as, the beamformed downlink channel gain of interference link 210-*a*, which may be derived from the downlink reference signal from non-target TRP 145-*b* (e.g., of interference link 210-*a*) based on downlink-uplink channel reciprocity.

In some cases, the beam determination procedure may be based on increasing, or maximizing, a ratio of a beamformed uplink channel gain of a target link 205 over a beamformed uplink interference strength of an interference link 210. For example, UE 115-*a* may select a beam based on the transmission power of one or more reference signals received from target TRP 145-*a* and non-target TRP 145-*b*. In some cases, base station 105-*a* may indicate the absolute value of the transmission power of each of the one or more reference signals to UE 115-*a*. In some other cases, base station 105-*a* may indicate the relative transmission power of one or more reference signals (e.g., the transmission power of a second reference signal is 3 dB (decibels) higher than the transmission power of the first reference signal) to UE 115-*a*. In such cases, the beam determination procedure may be specified prior to communication between UE 115-*a* and base station 105-*a*. For example, the reference signal transmission powers may be predetermined values. Base station 105-*a* may indicate the beam determination procedure to UE 115-*a* in a configuration message (e.g., the SRS resource configuration message).

In some examples, a base station 105 may transmit a signaling message to a UE 115. For example, base station 105-*a* may transmit a signaling message about SRS resource configurations to UE 115-*a*. The signaling message may indicate the identities of one or more reference signals from a target TRP 145-*a* and non-target TRP 145-*b*, such as an SSB index or CSI-RS index (e.g., reference signal identity for an interference link may be ssb-Index, csi-RS-Index, SSB-Index, or NZP-CSI-RS-ResourceId). The signaling message may be transmitted in an RRC signaling message, a MAC-CE, a DCI, or a combination thereof. Thus, the SRS spatial relation may have one or more reference signal identities (e.g., a target TRP 145-*a* reference signal identity and a non-target TRP 145-*b* reference signal identity). If UE 115-*a* transmits an SRS in a corresponding SRS resource, UE 115-*a* may determine the beam based on the SRS resource configuration message, including a reference signal index for a target link 205-a and a reference signal index for an interference link 210 and the beam determination procedure.

For example, if UE 115-a is communicating in a first frequency spectrum (e.g., FR1 spectrum, not higher than the 6 GHz spectrum), UE 115-a may determine an SRS beam based on the procedure involving maintaining the beamformed uplink interference strength of interference link 210 (e.g., generating zero interference). In some cases, UE 115-a may receive reference signals from target TRP 145-a and non-target TRP 145-b via target link 205-a and non-target link 215-a respectively. UE 115-a may derive an uplink channel response matrix from target TRP 145-a and non-target TRP 145-b based on the received reference signals and the uplink-downlink channel reciprocity, denoted as $H_{11}$ and $H_{12}$. UE 115-a may calculate the orthogonal projection matrix of $H_{12}$, denoted as $P_{12}$ (e.g., $P_{12}=I-H_{21}^{H}(H_{21}H_{21}^{H})^{-1}H_{21}$), such that for any matrix A with the same number of columns as $H_{12}$, the matrix of $AP_{12}$ is orthogonal to $H_{12}$. UE 115-a may calculate the projection of $H_{11}$ onto $P_{12}$, denoted as $H'_{11}$, such that $H'_{11}=H_{11}P_{12}$. In some cases, UE 115-a may perform singular-value decomposition (SVD) to $H'_{11}$, generating [U, L, V]=SVD($H'_{11}$), such that the SRS beam may be along the major eigen vectors of V. For example, UE 115-a may calculate the major eigen vector of the projected matrix as a beamforming weight vector of the SRS transmission beam.

In some other examples, if UE 115-a is communicating in a frequency spectrum different from the first (e.g., FR2 spectrum, higher than the 6 GHz spectrum), UE 115-a may sweep a plurality of candidate reception beams to receive the one or more reference signals from target TRP 145-a and non-target TRP 145-b. In some cases, UE 115-a may measure the beamformed channel gains over target link 205-a and interference link 210-a for each candidate reception beam. Then, UE 115-a may choose a reception beam based on the configured beam determination procedure with the measured beamformed channel gains as input. UE 115-a may select the reception beam as the SRS transmission beam.

The techniques described herein may allow a UE 115 to determine an SRS beam based on a beam determination procedure and TRP reference signals. The SRS beam may improve the channel gain of a target link 205 and reduce the interference strength of an interference link 210. When the UE 115 transmits the uplink data channel signal with the determined SRS beam, the interference of the interference link 210 may improve. In some cases, due to the reduced interference, a base station 105 may schedule a different uplink data transfer at the same time-frequency resource as the transmission from UE 115. Thus, the uplink transmission throughput for TRPs 145 communicating with the base station 105 may improve.

Figure 3:
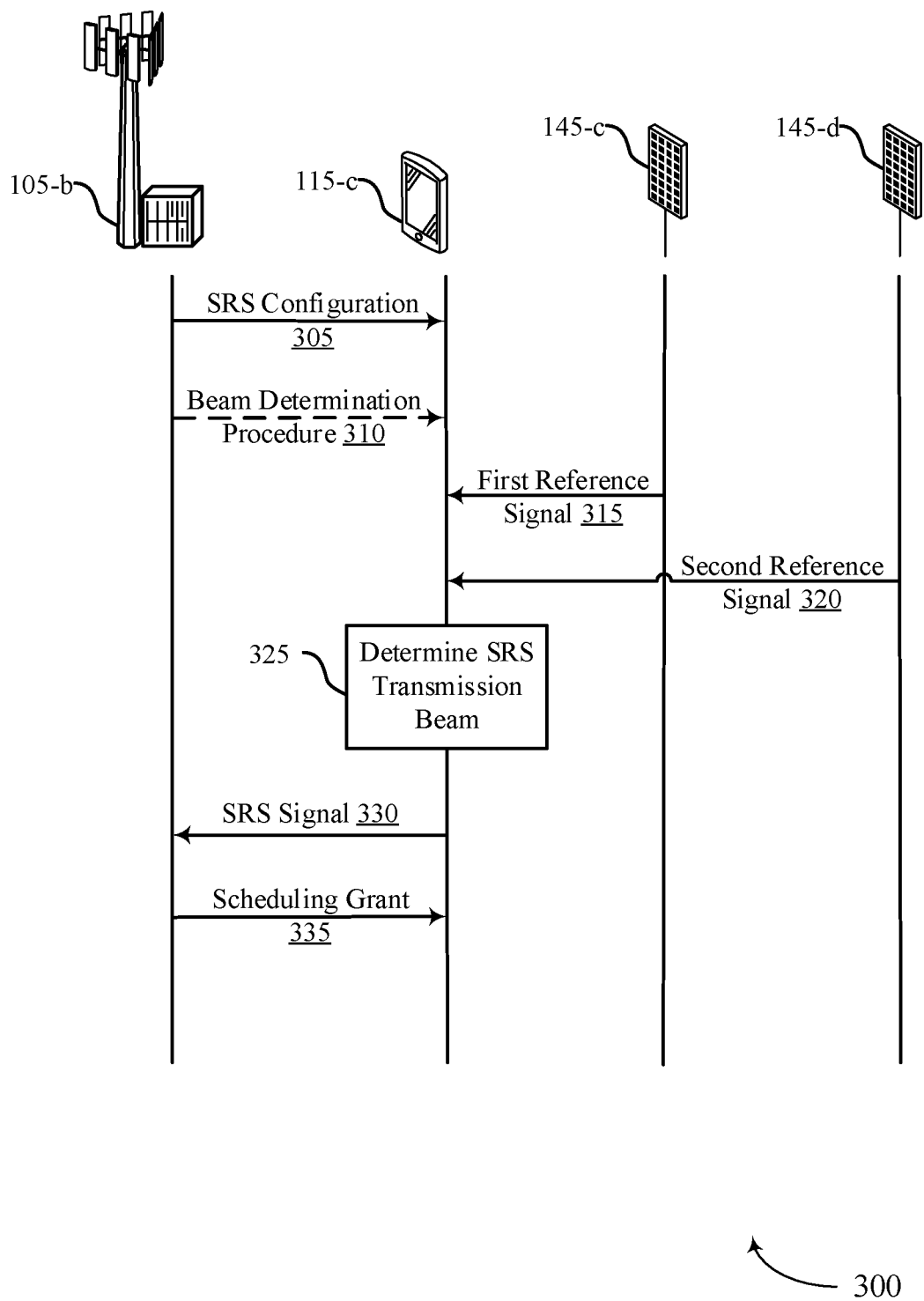
FIG. 3 illustrates an example of a process flow that supports SRS configuration in accordance with aspects of the present disclosure.

FIG. 3 illustrates an example of a process flow 300 that supports SRS configuration techniques for wireless communications systems in accordance with aspects of the present disclosure. In some examples, process flow 300 may implement aspects of wireless communications systems 100 and wireless communications system 200. Process flow 300 includes UE 115-c, TRP 145-c, TRP 145-d, and base station 105-b, which may be respective examples of a UE 115, a TRP 145, and a base station 105 as described with reference to FIGS. 1 and 2. A TRP 145 may be an example of a node. Alternative examples of the following may be implemented, where some processes are performed in a different order than described or are not performed. In some cases, processes may include additional features not mentioned below, or further processes may be added.

At 305, base station 105-b may transmit an SRS configuration message to UE 115-c. In some cases, TRP 145-c may be a target TRP 145 and TRP 145-d may be a non-target TRP 145 for UE 115-c. The SRS configuration message may indicate one or more first reference signals from target TRP 145-a and one or more second reference signals from non-target TRP 145-b. For example, base station 105-b may transmit an indication of the transmission power of the one or more first reference signals and the one or more second reference signals. Additionally or alternatively, the SRS configuration message may indicate an identity of a resource associated with the one or more first reference signals, the one or more second reference signals, or both. Base station 105-b may transmit the SRS configuration message via RRC signaling, a MAC-CE, or a combination thereof.

At 310, base station 105-b may transmit a beam determination procedure specifying criterion for the UE 115-c to determine the SRS transmission beam. In some cases, the beam determination procedure may include determining that the SRS transmission beam maximizes an uplink channel gain on an uplink channel between UE 115-c and target TRP 145-c and generates zero interference on an uplink channel between UE 115-c and non-target TRP 145-d. In some other cases, the beam determination procedure may include determining that the SRS transmission beam maximizes a ratio of the uplink channel gain and the interference. Additionally or alternatively, base station 105-b may transmit an indication of the transmission power for the one or more first reference signals and the one or more second reference signals to UE 115-c.

At 315, UE 115-c may receive one or more first reference signals from target TRP 145-c. Similarly, at 320, UE 115-c may receive one or more second reference signals from target TRP 145-d. In some cases, the reference signals may include CSI reference signals, SSB reference signals, demodulation reference signals, or a combination thereof. UE 115-c may sweep a plurality of candidate reception beams to receive the reference signals from TRP 145-c and TRP 145-d. In some examples, UE 115-c may identify a transmission power of the one or more first reference signals and a transmission power of the one or more second reference signals. For example, UE 115-c may identify an absolute value of the transmission powers. In some cases, UE 115-c may identify a relationship between the transmission powers. For example, UE 115-c may determine a first and second uplink channel response matrix based on the reference signals from TRP 145-c and TRP 145-d respectively. UE 115-c may determine an orthogonal projection matrix of the second uplink channel response matrix. Additionally, UE 115-c may determine a projected matrix of the first uplink channel response matrix onto the orthogonal projected matrix. UE 115-c may calculate a major eigen vector of the projected matrix, which UE 115-c may use as a beamforming weight vector of the SRS transmission beam.

At 325, UE 115-c may determine an SRS transmission beam for an SRS signal. In some cases, the SRS transmission beam may be based on the beam determination procedure, the one or more first reference signals, and the one or more second reference signals. For example, UE 115-c may determine the SRS transmission beam maximizes the uplink channel gain on an uplink channel between UE 115-c and target TRP 145-c and generates zero interference on the uplink channel between UE 115-d and non-target TRP 145-d. In some cases, UE 115-c may determine the uplink channel gain between UE 115-c and target TRP 145-c based on the first reference signals. In some other cases, UE 115-c may determine the interference between UE 115-c and non-target TRP 145-d based on the second reference signals. In some other examples, the SRS transmission beam may maximize the ratio of the uplink channel gain on the uplink channel between UE 115-c and target TRP 145-c and the interference on the uplink channel between UE 115-c and non-target TRP 145-d.

At 330, base station 105-b may receive the SRS signal from UE 115-c. In some cases, UE 115-c may transmit the SRS signal using the determined SRS transmission beam, where the SRS transmission beam is based on the SRS transmission beam procedure and the reference signals.

At 335, base station 105-b may transmit an uplink scheduling grant based on the SRS signal from UE 115-c. Base station 105-b and UE 115-c may communicate according to the uplink scheduling grant.

Figure 4:
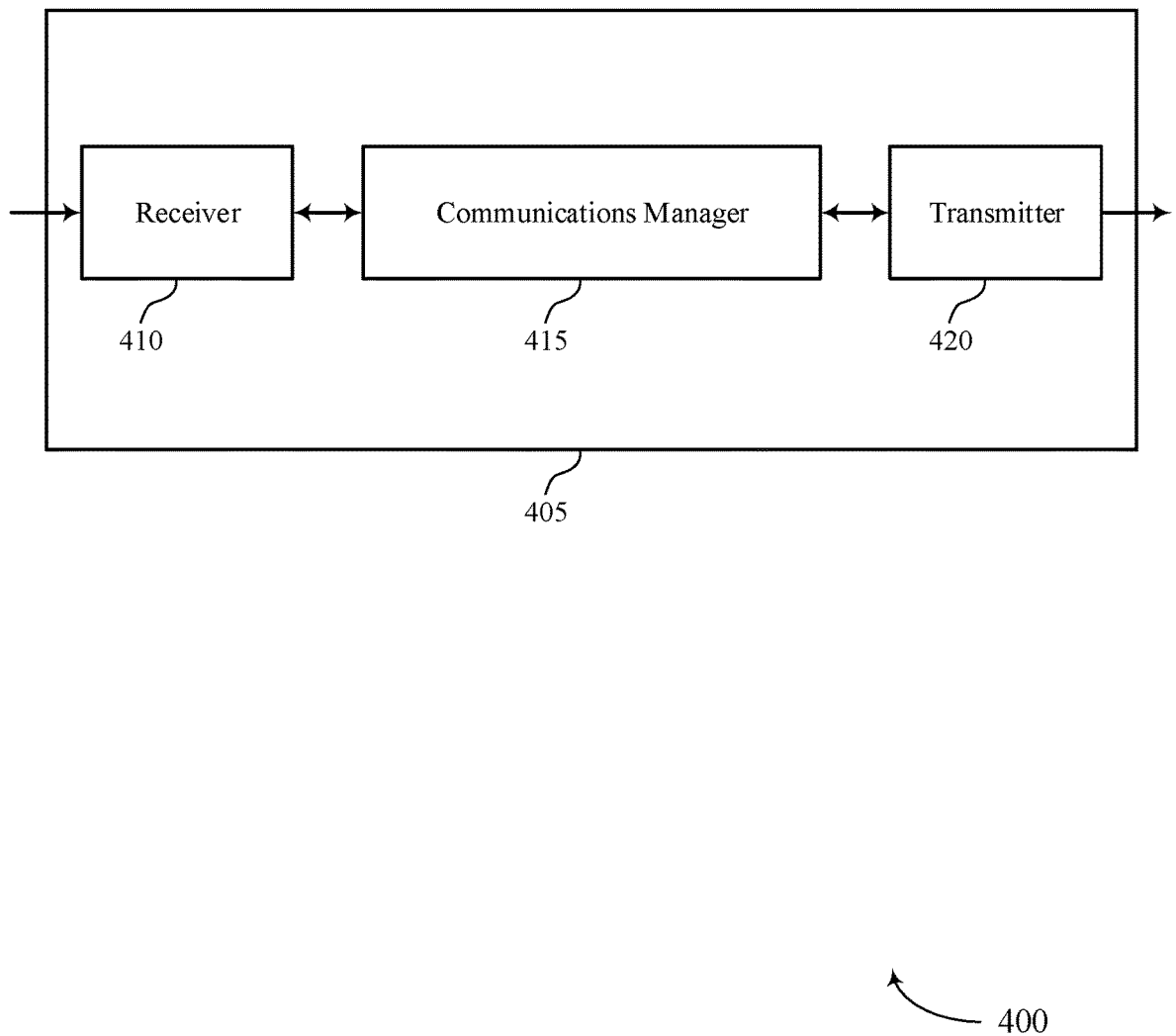
FIGS. 4 and 5 show block diagrams of devices that support SRS configuration in accordance with aspects of the present disclosure.

FIG. 4 shows a block diagram 400 of a device 405 that supports SRS configuration in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to SRS configuration, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive an SRS configuration message that indicates one or more first reference signals from a first node and one or more second reference signals from a second node, determine an SRS transmission beam for transmitting an SRS signal based on a procedure for determining the SRS transmission beam, the one or more first reference signals, and the one or more second reference signals, and transmit the SRS signal using the SRS transmission beam. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signaling processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
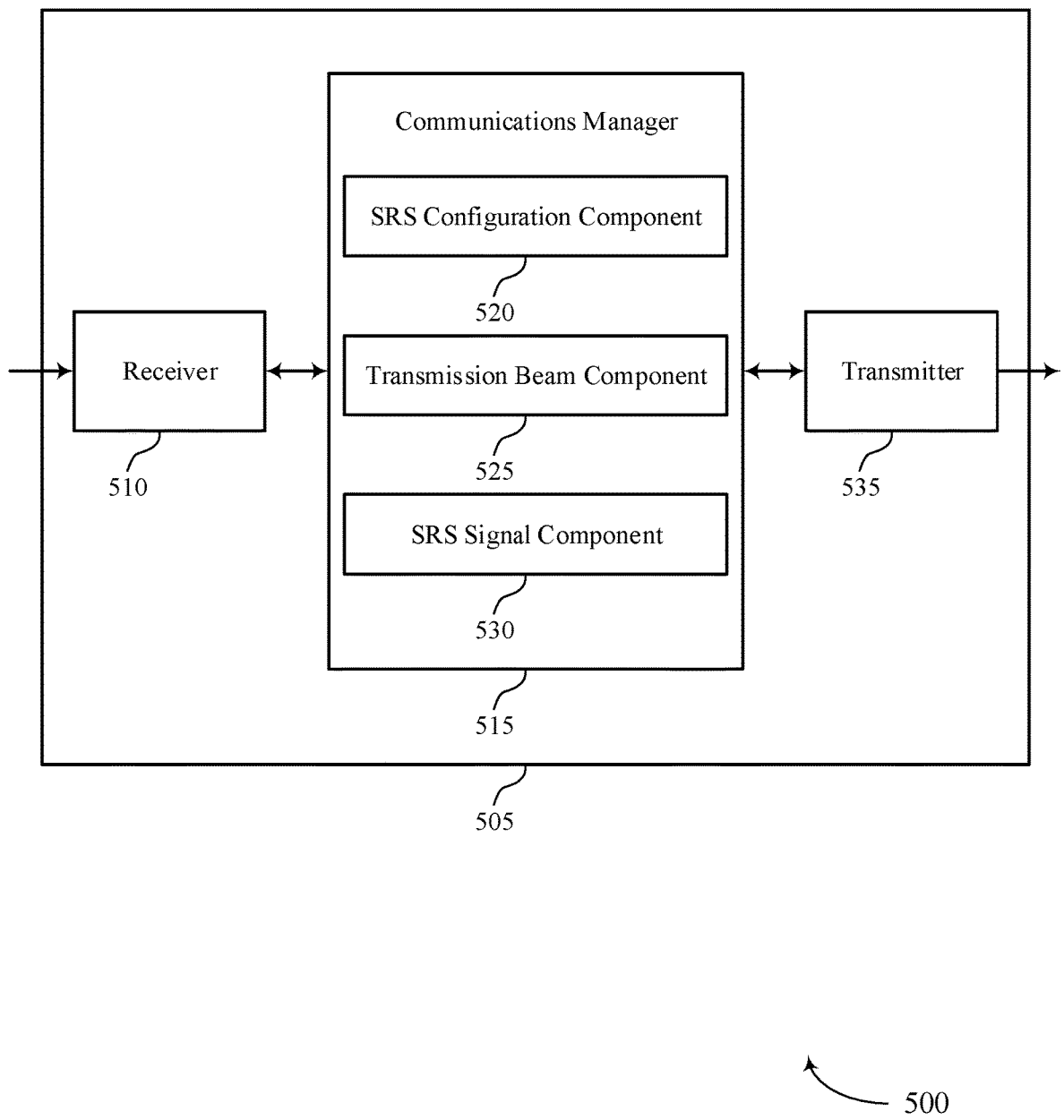

FIG. 5 shows a block diagram 500 of a device 505 that supports SRS configuration in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to SRS configuration, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include an SRS configuration component 520, a transmission beam component 525, and an SRS signal component 530. The communications manager 515 may be an example of aspects of the communications manager 710 described herein.

The actions performed by the communications manager 515 as described herein may be implemented to realize one or more potential advantages. One implementation may enable a base station to transmit an SRS configuration message that indicates reference signals from one or more TRPs to a UE. Such indications may enable techniques for determining an SRS transmission beam at the UE, which may result in higher data rates and more efficient communications (e.g., less communication errors), among other advantages.

Based on implementing the indications as described herein, a processor of a UE or base station (e.g., a processor controlling the receiver 510, the communications manager 515, the transmitter 520, or a combination thereof) may reduce the impact or likelihood of interference in a communications system while ensuring relatively efficient communications. For example, the reporting techniques described herein may leverage a relationship between the reference signals as well as the transmission beam determination procedure, which may realize reduced signaling overhead and power savings, among other benefits.

The SRS configuration component 520 may receive an SRS configuration message that indicates one or more first reference signals from a first node and one or more second reference signals from a second node.

The transmission beam component 525 may determine an SRS transmission beam for transmitting an SRS signal based on a procedure for determining the SRS transmission beam, the one or more first reference signals, and the one or more second reference signals.

The SRS signal component 530 may transmit the SRS signal using the SRS transmission beam. The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
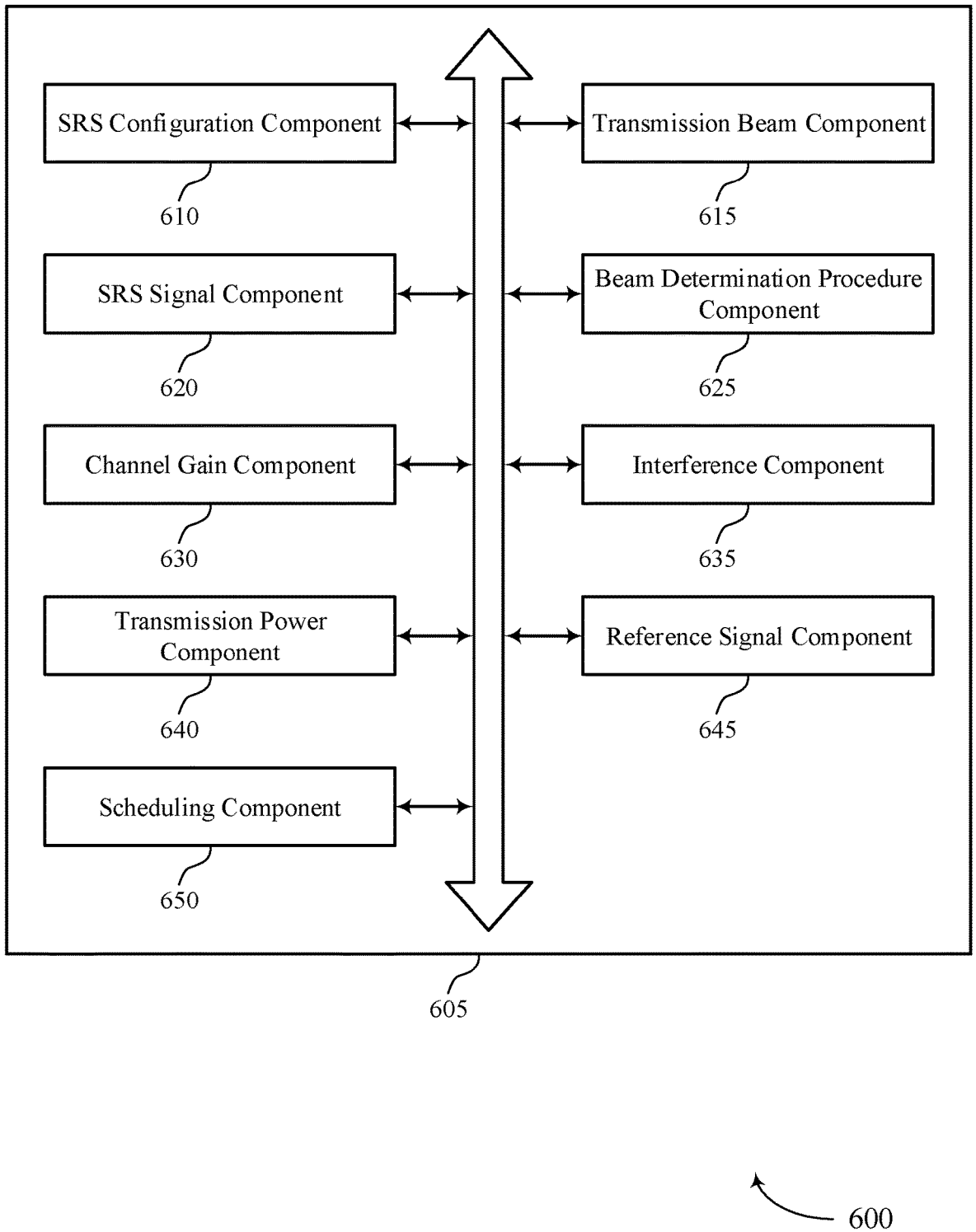
FIG. 6 shows a block diagram of a communications manager that supports SRS configuration in accordance with aspects of the present disclosure.

FIG. 6 shows a block diagram 600 of a communications manager 605 that supports SRS configuration in accordance with aspects of the present disclosure. The communications manager 605 may be an example of aspects of a communications manager 415, a communications manager 515, or a communications manager 710 described herein. The communications manager 605 may include an SRS configuration component 610, a transmission beam component 615, an SRS signal component 620, a beam determination procedure component 625, a channel gain component 630, an interference component 635, a transmission power component 640, a reference signal component 645, and a scheduling component 650. Each of these modules may communicate, directly or indirectly, with one another (e.g., via one or more buses).

The SRS configuration component 610 may receive an SRS configuration message that indicates one or more first reference signals from a first node and one or more second reference signals from a second node. In some cases, the SRS configuration message indicates an identity of a resource associated with the one or more first reference signals, the one or more second reference signals, or both. In some examples, the SRS configuration message is received via radio resource control signaling, a medium access control layer control element, a downlink control information message, or a combination thereof. In some cases, the one or more first reference signals or the one or more second reference signals include channel state information reference signals, synchronization signal block reference signals, demodulation reference signals, or a combination thereof. In some cases, the first node includes a target node and the second node includes a non-target node with respect to the UE.

The transmission beam component 615 may determine an SRS transmission beam for transmitting an SRS signal based on a procedure for determining the SRS transmission beam, the one or more first reference signals, and the one or more second reference signals. The SRS signal component 620 may transmit the SRS signal using the SRS transmission beam. The beam determination procedure component 625 may receive an indication of the procedure for determining the SRS transmission beam.

In some examples, the beam determination procedure component 625 may determine that the SRS transmission beam maximizes an uplink channel gain on an uplink channel between the UE and the first node and generates zero interference on an uplink channel between the UE and the second node.

In some examples, the beam determination procedure component 625 may determine that the SRS transmission beam maximizes a ratio of an uplink channel gain on an uplink channel between the UE and the first node and an interference on an uplink channel between the UE and the second node.

The channel gain component 630 may determine the uplink channel gain on the uplink channel between the UE and the first node based on the one or more first reference signals. The interference component 635 may determine an interference on the uplink channel between the UE and the second node based on the one or more second reference signals. The transmission power component 640 may identify a transmission power of the one or more first reference signals and a transmission power of the one or more second reference signals. In some examples, the transmission power component 640 may identify a relationship between the transmission power of the one or more first reference signals and the transmission power of the one or more second reference signals. In some examples, the transmission power component 640 may identify an absolute value of the transmission power of the one or more first reference signals and an absolute value of the one or more second reference signals.

In some examples, the transmission power component 640 may receive an indication of the transmission power of the one or more first reference signals and the transmission power of the one or more second reference signals.

The reference signal component 645 may receive the one or more first reference signals from the first node. In some examples, the reference signal component 645 may receive the one or more second reference signals from the second node. In some examples, the reference signal component 645 may sweep a set of candidate reception beams to receive the one or more first reference signals and the one or more second reference signals.

In some examples, the reference signal component 645 may determine a first uplink channel response matrix for the first node based on the one or more reference signals and a second uplink channel response matrix for the second node based on the one or more second reference signals. In some examples, the reference signal component 645 may determine an orthogonal projection matrix of the second uplink channel response matrix. In some examples, the reference signal component 645 may determine a projected matrix based on a projection of the first uplink channel response matrix onto the orthogonal projection matrix. In some examples, the reference signal component 645 may calculate a major eigen vector of the projected matrix as a beamforming weight vector of the SRS transmission beam. The scheduling component 650 may receive an uplink scheduling grant that is based on the transmitted SRS signal.

Figure 7:
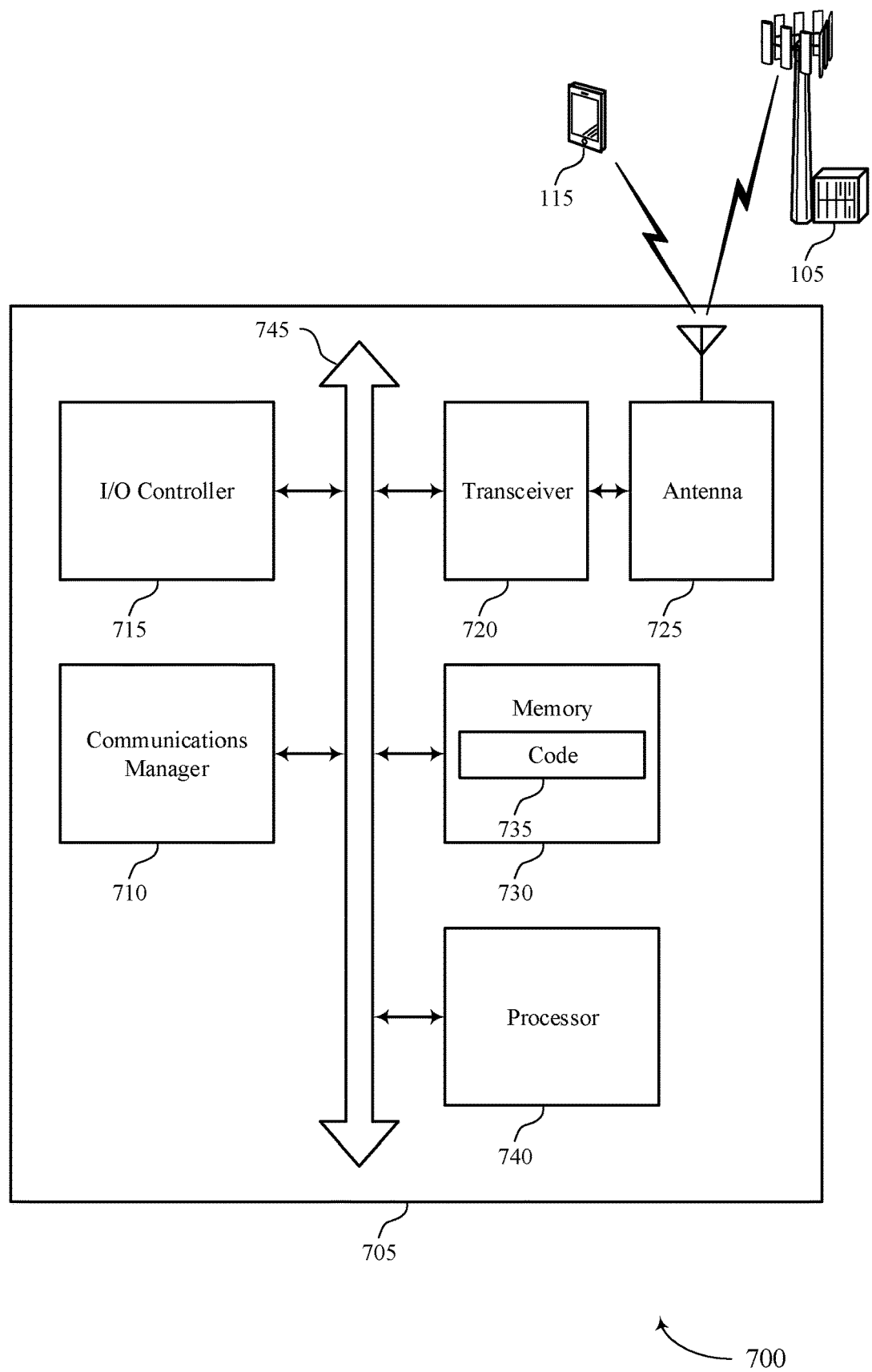
FIG. 7 shows a diagram of a system including a device that supports SRS configuration in accordance with aspects of the present disclosure.

FIG. 7 shows a diagram of a system 700 including a device 705 that supports SRS configuration in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive an SRS configuration message that indicates one or more first reference signals from a first node and one or more second reference signals from a second node, determine an SRS transmission beam for transmitting an SRS signal based on a procedure for determining the SRS transmission beam, the one or more first reference signals, and the one or more second reference signals, and transmit the SRS signal using the SRS transmission beam.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In some other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases, the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting SRS configuration).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
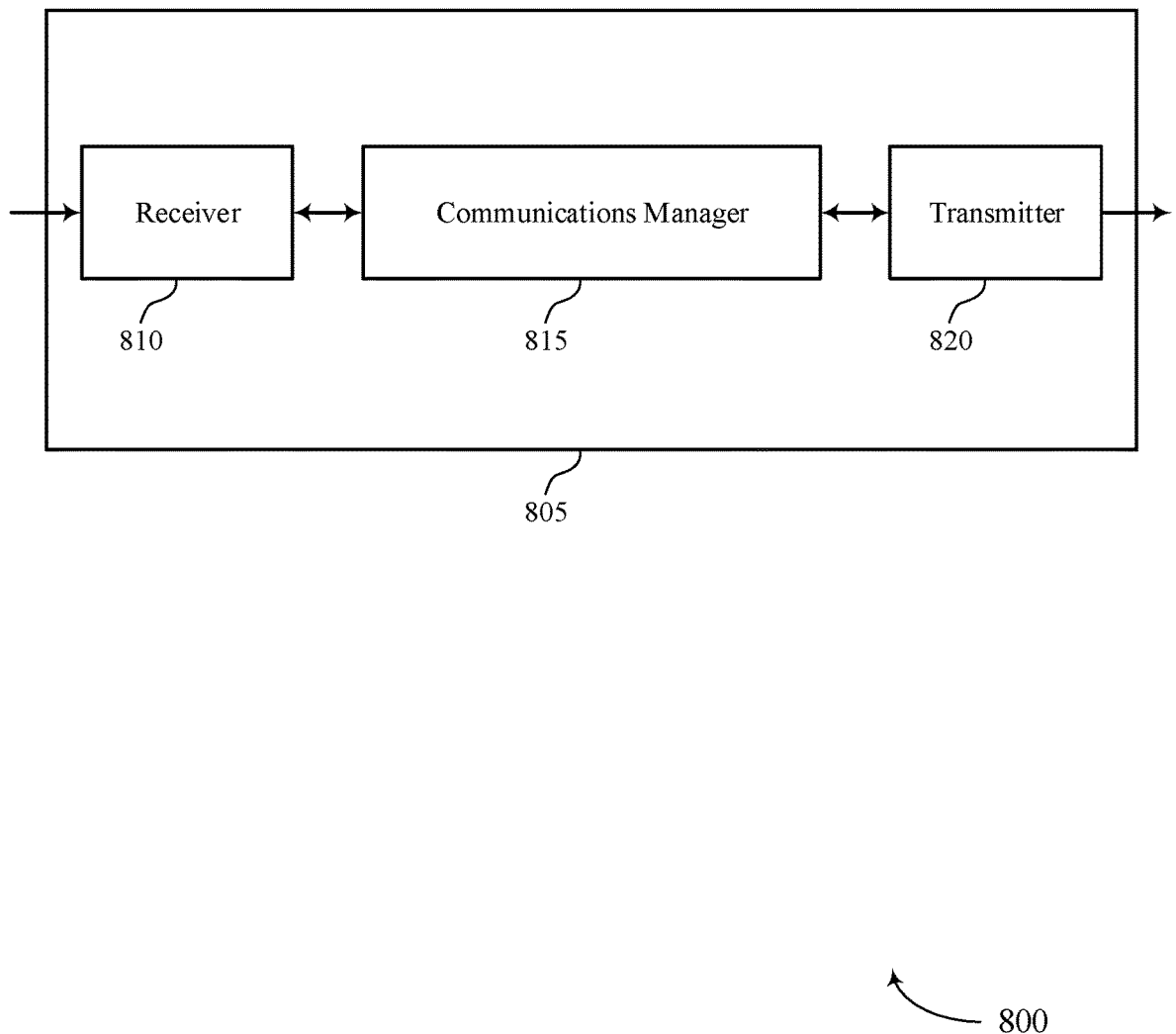
FIGS. 8 and 9 show block diagrams of devices that support SRS configuration in accordance with aspects of the present disclosure.

FIG. 8 shows a block diagram 800 of a device 805 that supports SRS configuration in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to SRS configuration, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit an SRS configuration message that indicates one or more first reference signals from a first node and one or more second reference signals from a second node and receive, from a UE, an SRS signal using an SRS transmission beam that is based on a procedure for determining the SRS transmission beam, the one or more first reference signals, and the one or more second reference signals. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
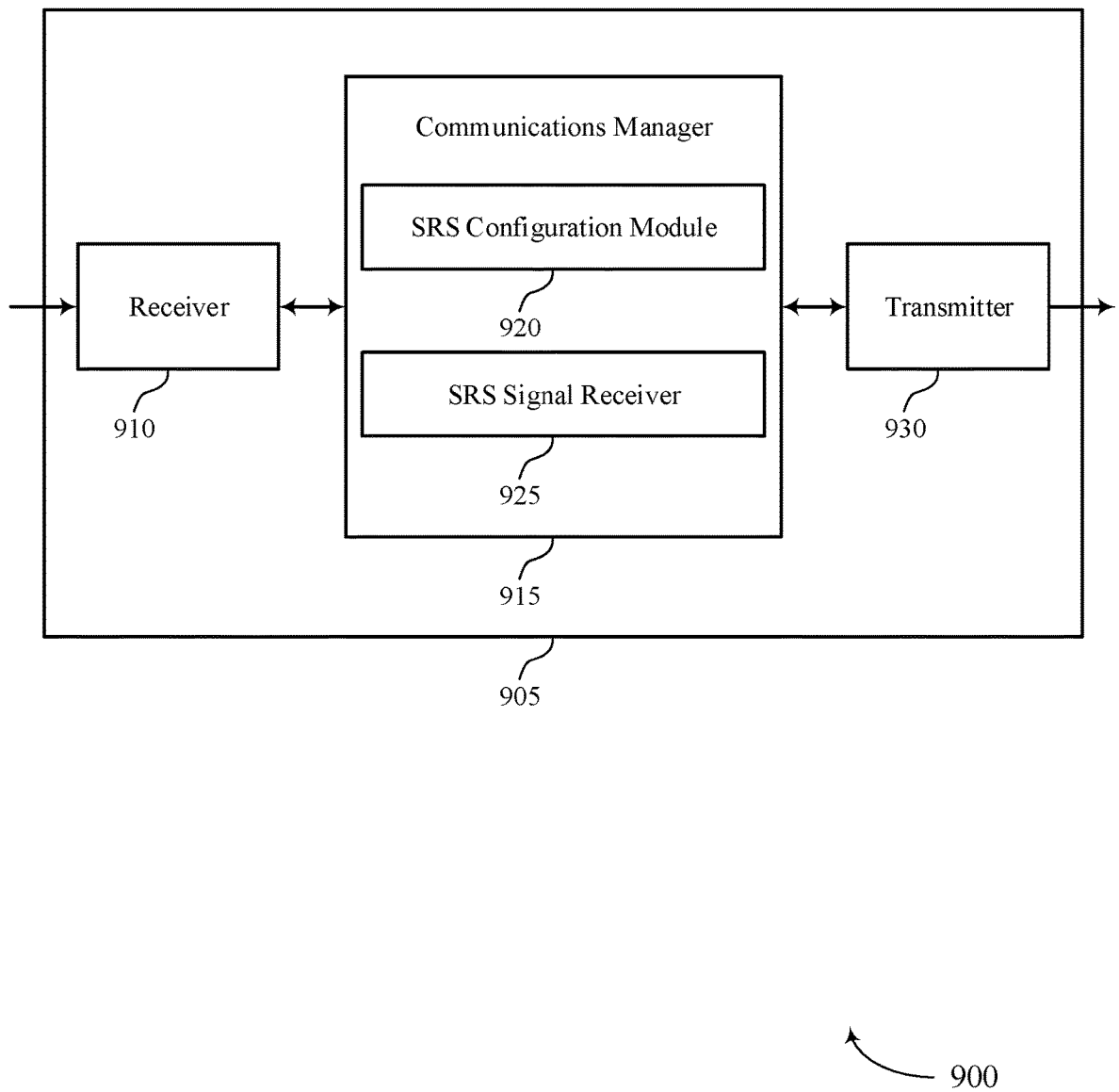

FIG. 9 shows a block diagram 900 of a device 905 that supports SRS configuration in accordance with aspects of the present disclosure. The device 905 may be an example of aspects of a device 805, or a base station 105 as described herein. The device 905 may include a receiver 910, a communications manager 915, and a transmitter 930. The device 905 may also include a processor. Each of these components may be in communication with one another (e.g., via one or more buses).

The receiver 910 may receive information such as packets, user data, or control information associated with various information channels (e.g., control channels, data channels, and information related to SRS configuration, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an SRS configuration module 920 and an SRS signal receiver 925. The communications manager 915 may be an example of aspects of the communications manager 1110 described herein.

The SRS configuration module 920 may transmit an SRS configuration message that indicates one or more first reference signals from a first node and one or more second reference signals from a second node.

The SRS signal receiver 925 may receive, from a UE, an SRS signal using an SRS transmission beam that is based on a procedure for determining the SRS transmission beam, the one or more first reference signals, and the one or more second reference signals.

The transmitter 930 may transmit signals generated by other components of the device 905. In some examples, the transmitter 930 may be collocated with a receiver 910 in a transceiver module. For example, the transmitter 930 may be an example of aspects of the transceiver 1120 described with reference to FIG. 11. The transmitter 930 may utilize a single antenna or a set of antennas.

Figure 10:
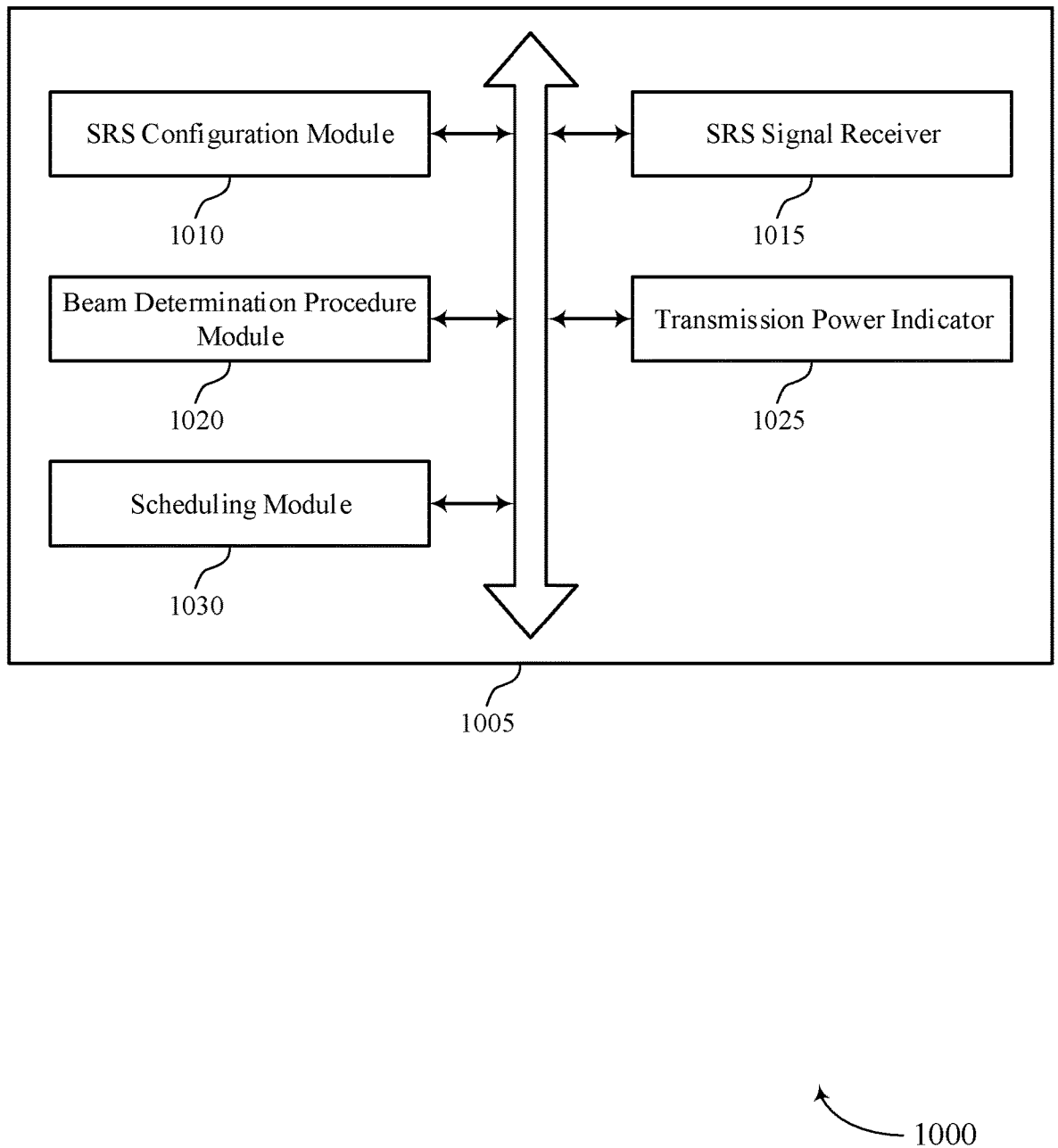
FIG. 10 shows a block diagram of a communications manager that supports SRS configuration in accordance with aspects of the present disclosure.

FIG. 10 shows a block diagram 1000 of a communications manager 1005 that supports SRS configuration in accordance with aspects of the present disclosure. The communications manager 1005 may be an example of aspects of a communications manager 815, a communications manager 915, or a communications manager 1110 described herein. The communications manager 1005 may include an SRS configuration module 1010, an SRS signal receiver 1015, a beam determination procedure module 1020, a transmission power indicator 1025, and a scheduling module 1030. Each of these modules may communicate, directly or indirectly, with one another (e.g., via one or more buses).

The SRS configuration module 1010 may transmit an SRS configuration message that indicates one or more first reference signals from a first node and one or more second reference signals from a second node. In some cases, the SRS configuration message indicates an identity of an index associated with the one or more first reference signals, the one or more second reference signals, or both. In some examples, the SRS configuration message is transmitted via radio resource control signaling, a medium access control layer control element, a downlink control information message, or a combination thereof. In some cases, the one or more first reference signals or the one or more second reference signals include channel state information reference signals, synchronization signal block reference signals, or both.

The SRS signal receiver 1015 may receive, from a UE, an SRS signal using an SRS transmission beam that is based on a procedure for determining the SRS transmission beam, the one or more first reference signals, and the one or more second reference signals. The beam determination procedure module 1020 may transmit an indication of the procedure for determining the SRS transmission beam.

In some examples, the beam determination procedure module 1020 may determine that the SRS transmission beam maximizes an uplink channel gain on an uplink channel between the UE and the first node and generates zero interference on an uplink channel between the UE and the second node.

In some examples, the beam determination procedure module 1020 may determine that the SRS transmission beam maximizes a ratio of an uplink channel gain on an uplink channel between the UE and the first node and an interference on an uplink channel between the UE and the second node.

The transmission power indicator 1025 may transmit an indication of a transmission power of the one or more first reference signals and a transmission power of the one or more second reference signals. The scheduling module 1030 may transmit an uplink scheduling grant that is based on the SRS signal.

Figure 11:
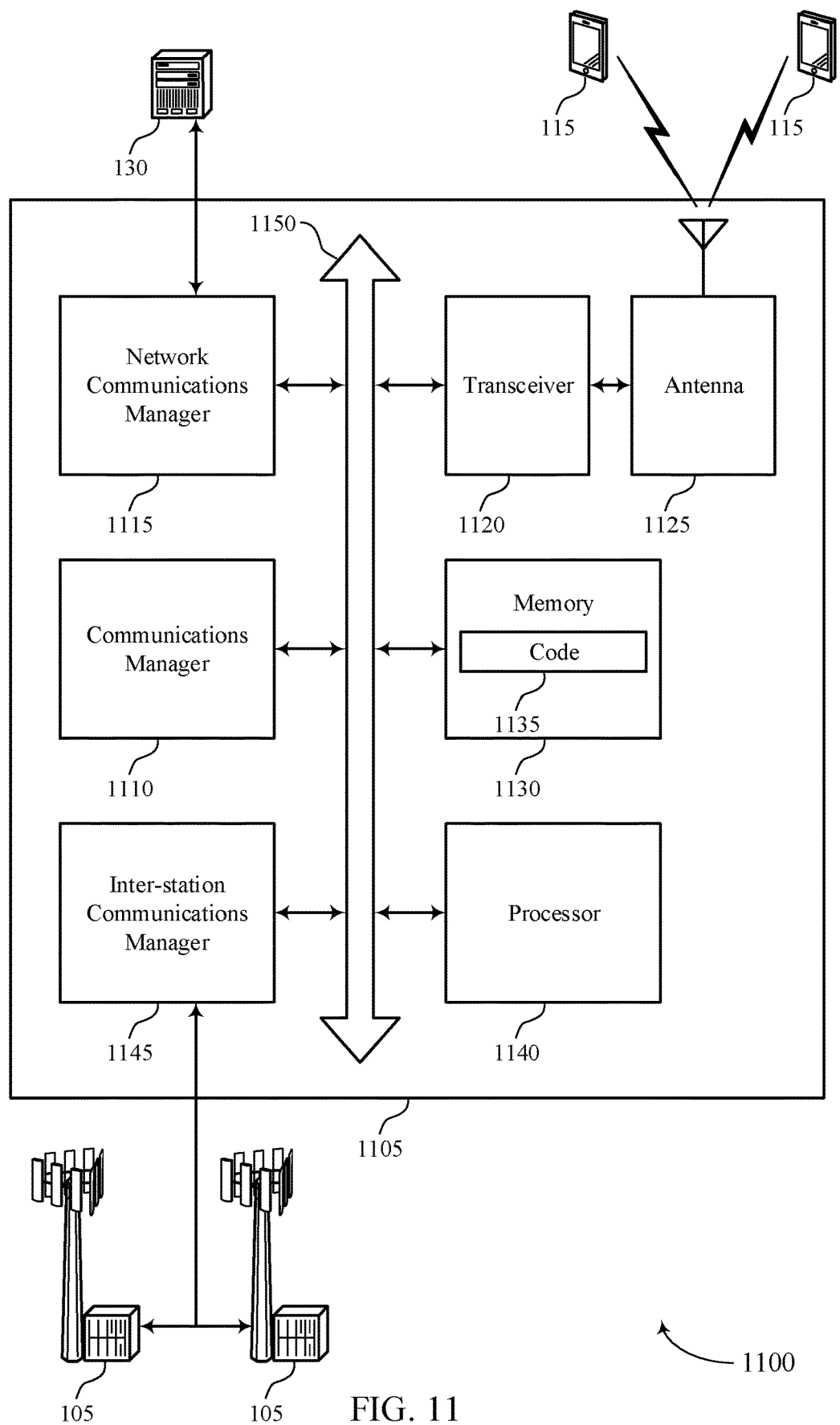
FIG. 11 shows a diagram of a system including a device that supports SRS configuration in accordance with aspects of the present disclosure.

FIG. 11 shows a diagram of a system 1100 including a device 1105 that supports SRS configuration in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit an SRS configuration message that indicates one or more first reference signals from a first node and one or more second reference signals from a second node and receive, from a UE, an SRS signal using an SRS transmission beam that is based on a procedure for determining the SRS transmission beam, the one or more first reference signals, and the one or more second reference signals.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases, the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor

1140. The processor 1140 may be configured to execute computer-readable instructions stored in a memory (e.g., the memory 1130) to cause the device 1105 to perform various functions (e.g., functions or tasks supporting SRS configuration).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
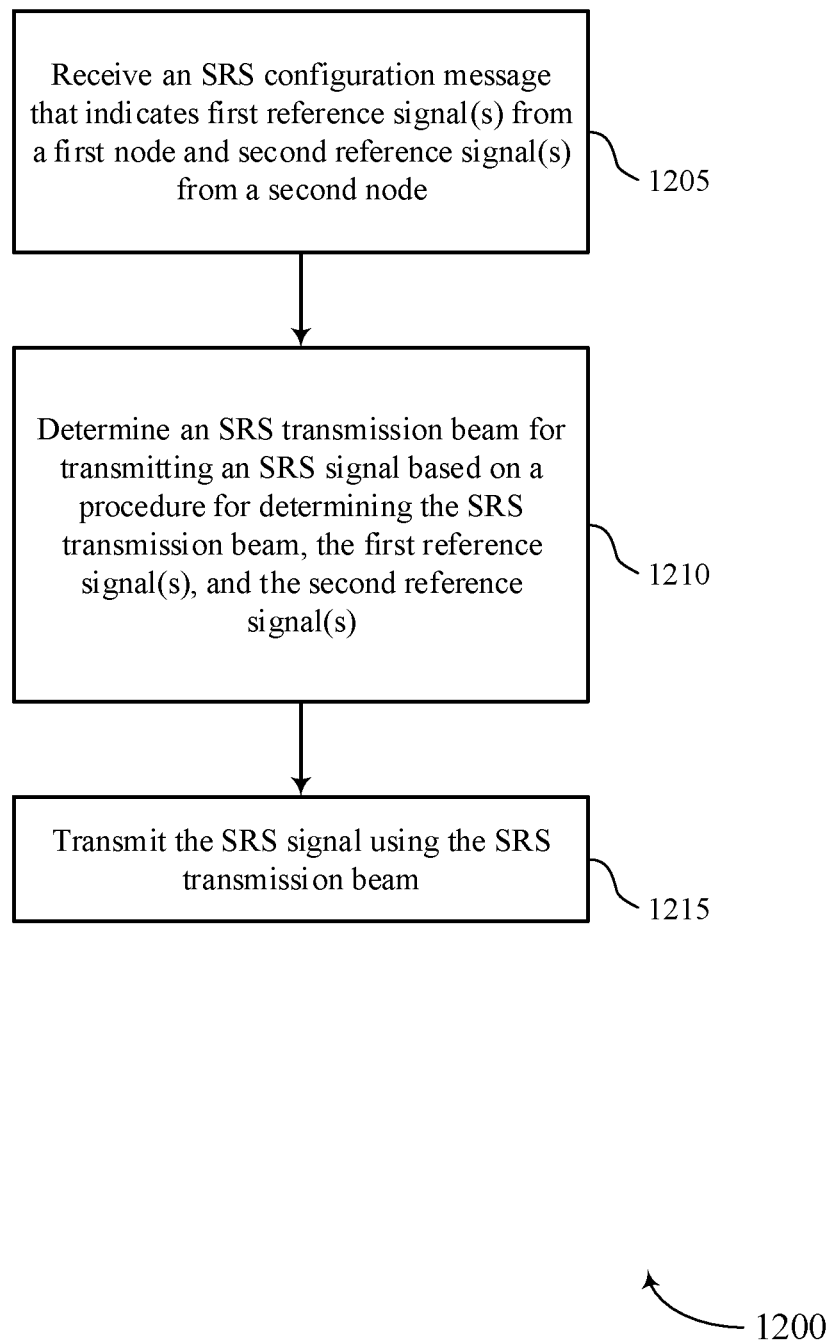
FIGS. 12 through 19 show flowcharts illustrating methods that support SRS configuration in accordance with aspects of the present disclosure.

FIG. 12 shows a flowchart illustrating a method 1200 that supports SRS configuration in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive an SRS configuration message that indicates one or more first reference signals from a first node and one or more second reference signals from a second node. The operations of 1205 may be performed according to the methods described herein. In some examples, aspects of the operations of 1205 may be performed by an SRS configuration component as described with reference to FIGS. 4 through 7.

At 1210, the UE may determine an SRS transmission beam for transmitting an SRS signal based on a procedure for determining the SRS transmission beam, the one or more first reference signals, and the one or more second reference signals. The operations of 1210 may be performed according to the methods described herein. In some examples, aspects of the operations of 1210 may be performed by a transmission beam component as described with reference to FIGS. 4 through 7.

At 1215, the UE may transmit the SRS signal using the SRS transmission beam. The operations of 1215 may be performed according to the methods described herein. In some examples, aspects of the operations of 1215 may be performed by an SRS signal component as described with reference to FIGS. 4 through 7.

Figure 13:
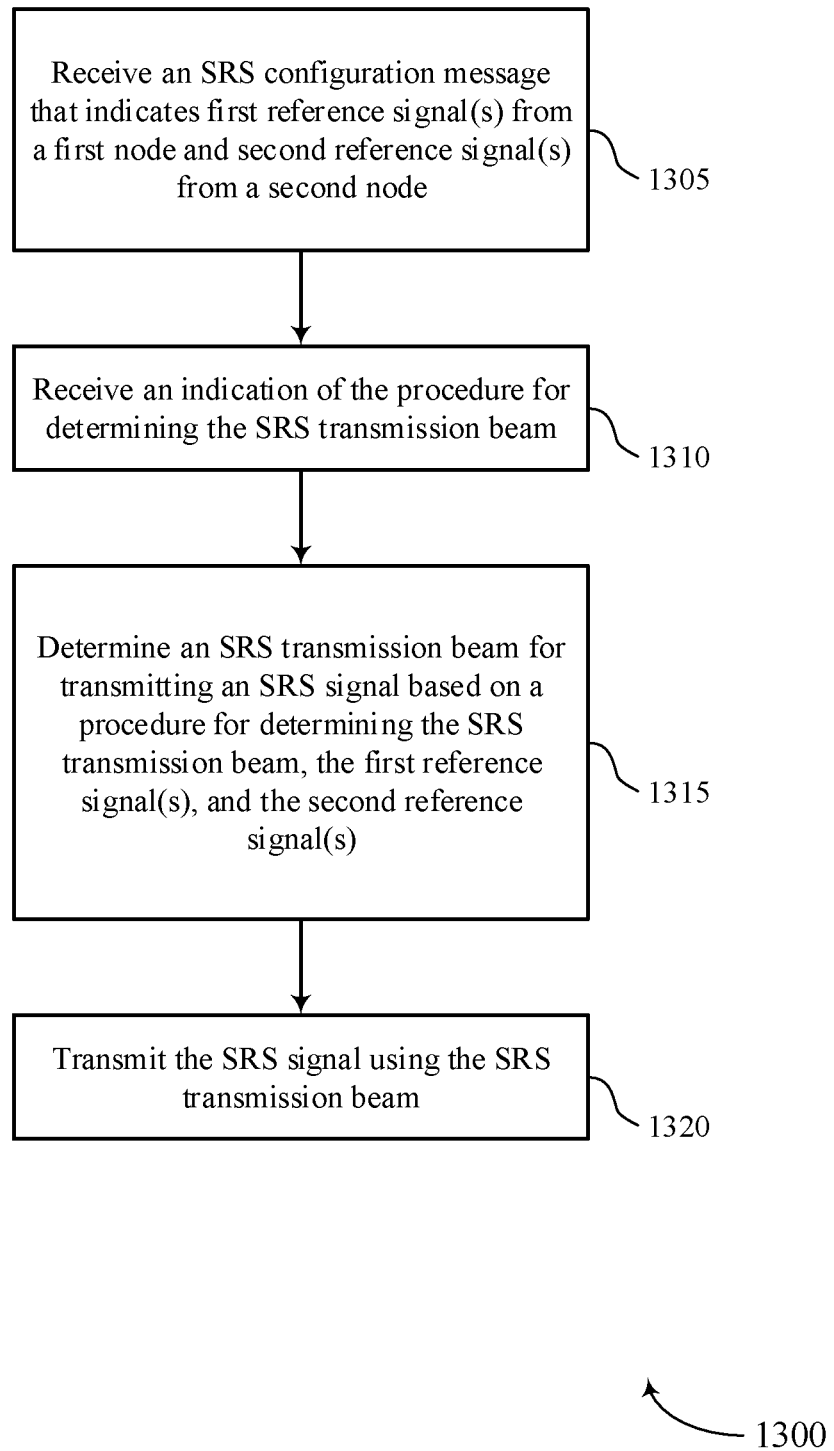

FIG. 13 shows a flowchart illustrating a method 1300 that supports SRS configuration in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive an SRS configuration message that indicates one or more first reference signals from a first node and one or more second reference signals from a second node. The operations of 1305 may be performed according to the methods described herein. In some examples, aspects of the operations of 1305 may be performed by an SRS configuration component as described with reference to FIGS. 4 through 7.

At 1310, the UE may receive an indication of the procedure for determining the SRS transmission beam. The operations of 1310 may be performed according to the methods described herein. In some examples, aspects of the operations of 1310 may be performed by a beam determination procedure component as described with reference to FIGS. 4 through 7.

At 1315, the UE may determine an SRS transmission beam for transmitting an SRS signal based on a procedure for determining the SRS transmission beam, the one or more first reference signals, and the one or more second reference signals. The operations of 1315 may be performed according to the methods described herein. In some examples, aspects of the operations of 1315 may be performed by a transmission beam component as described with reference to FIGS. 4 through 7.

At 1320, the UE may transmit the SRS signal using the SRS transmission beam. The operations of 1320 may be performed according to the methods described herein. In some examples, aspects of the operations of 1320 may be performed by an SRS signal component as described with reference to FIGS. 4 through 7.

Figure 14:
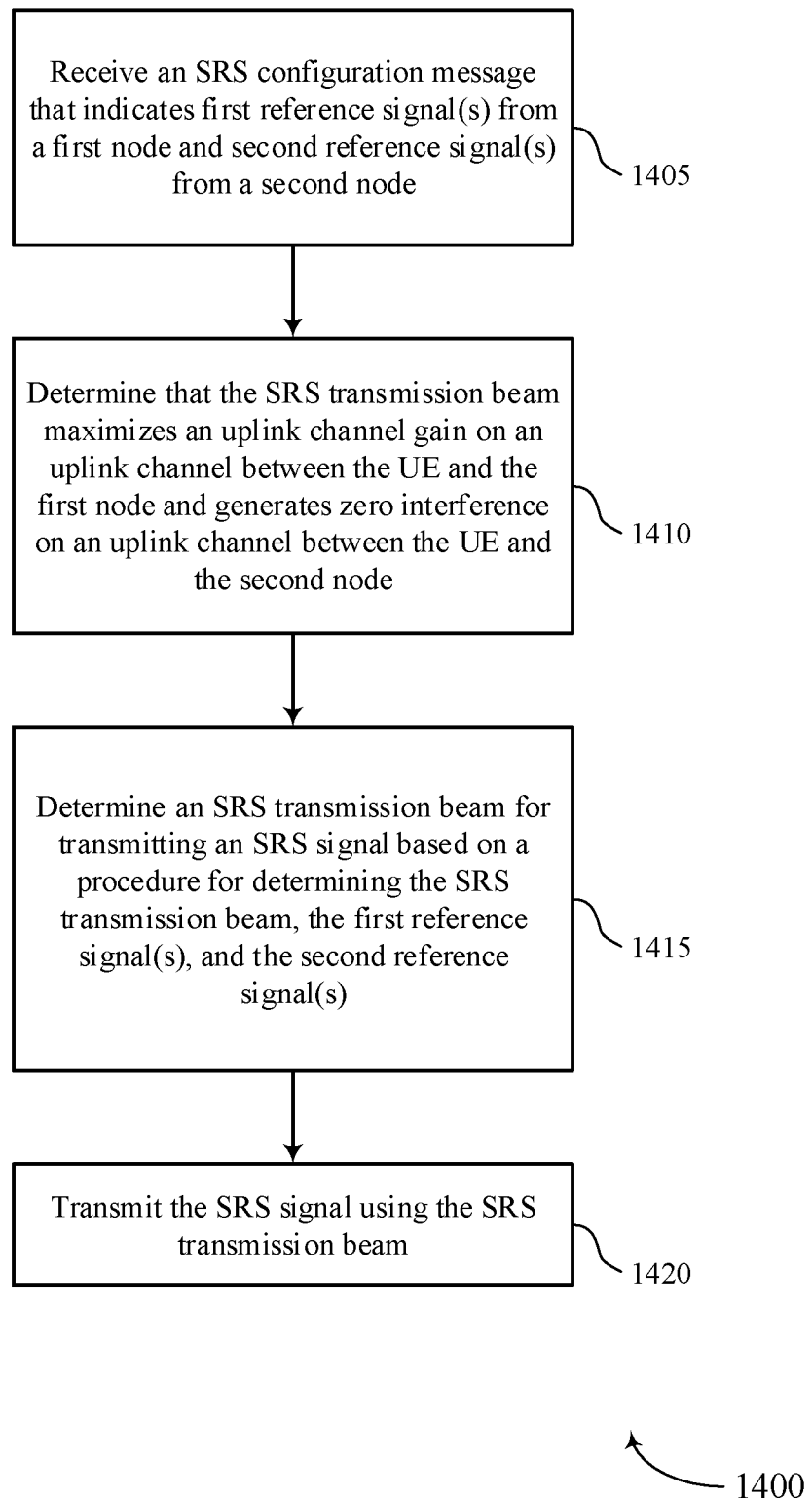

FIG. 14 shows a flowchart illustrating a method 1400 that supports SRS configuration in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive an SRS configuration message that indicates one or more first reference signals from a first node and one or more second reference signals from a second node. The operations of 1405 may be performed according to the methods described herein. In some examples, aspects of the operations of 1405 may be performed by an SRS configuration component as described with reference to FIGS. 4 through 7.

At 1410, the UE may determine that the SRS transmission beam maximizes an uplink channel gain on an uplink channel between the UE and the first node and generates zero interference on an uplink channel between the UE and the second node. The operations of 1410 may be performed according to the methods described herein. In some examples, aspects of the operations of 1410 may be performed by a beam determination procedure component as described with reference to FIGS. 4 through 7.

At 1415, the UE may determine an SRS transmission beam for transmitting an SRS signal based on a procedure for determining the SRS transmission beam, the one or more first reference signals, and the one or more second reference signals. The operations of 1415 may be performed according to the methods described herein. In some examples, aspects of the operations of 1415 may be performed by a transmission beam component as described with reference to FIGS. 4 through 7.

At 1420, the UE may transmit the SRS signal using the SRS transmission beam. The operations of 1420 may be performed according to the methods described herein. In some examples, aspects of the operations of 1420 may be performed by an SRS signal component as described with reference to FIGS. 4 through 7.

Figure 15:
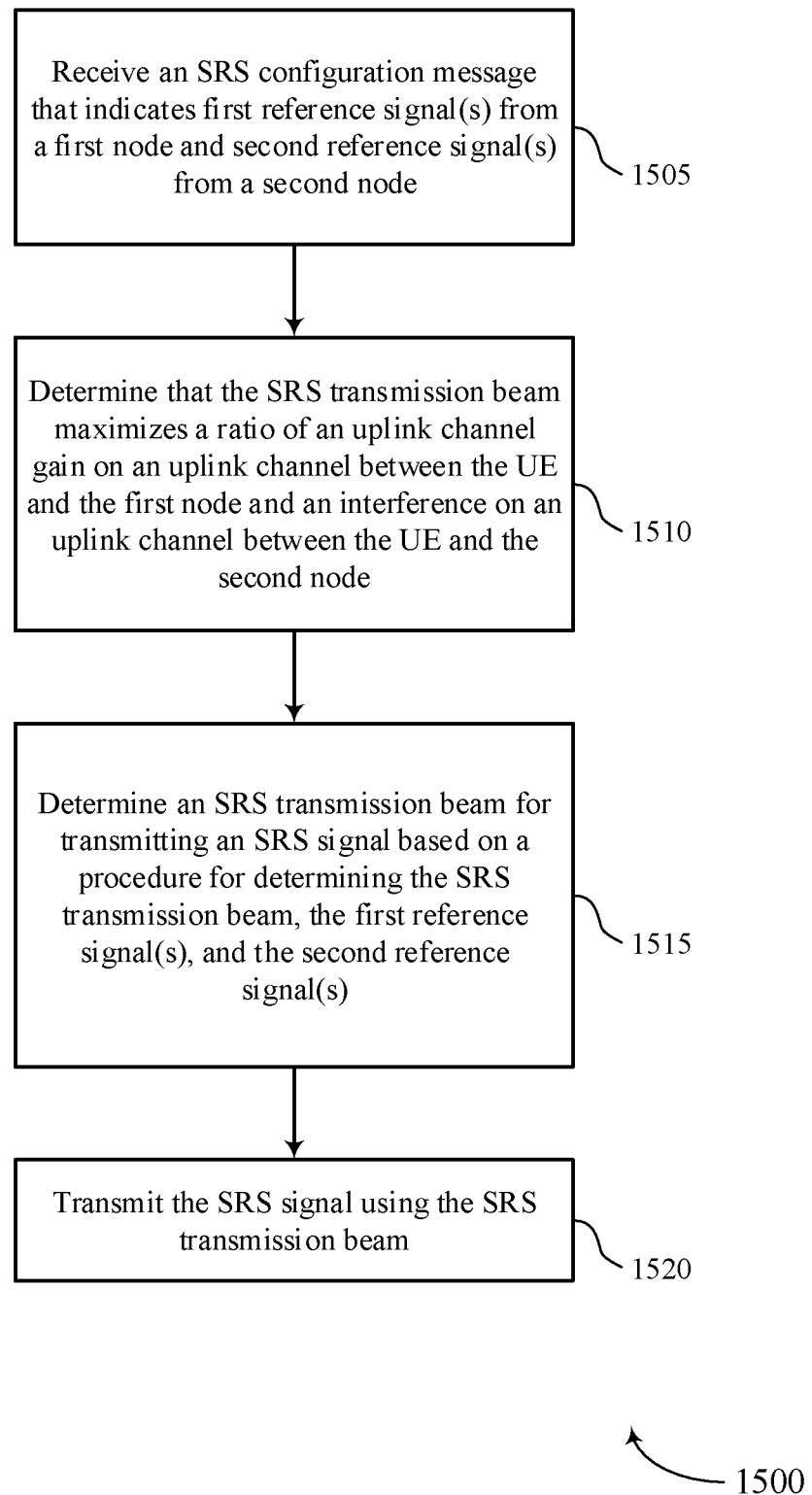

FIG. 15 shows a flowchart illustrating a method 1500 that supports SRS configuration in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1505, the UE may receive an SRS configuration message that indicates one or more first reference signals from a first node and one or more second reference signals from a second node. The operations of 1505 may be performed according to the methods described herein. In some examples, aspects of the operations of 1505 may be performed by an SRS configuration component as described with reference to FIGS. 4 through 7.

At 1510, the UE may determine that the SRS transmission beam maximizes a ratio of an uplink channel gain on an uplink channel between the UE and the first node and an interference on an uplink channel between the UE and the second node. The operations of 1510 may be performed according to the methods described herein. In some examples, aspects of the operations of 1510 may be performed by a beam determination procedure component as described with reference to FIGS. 4 through 7.

At 1515, the UE may determine an SRS transmission beam for transmitting an SRS signal based on a procedure for determining the SRS transmission beam, the one or more first reference signals, and the one or more second reference signals. The operations of 1515 may be performed according to the methods described herein. In some examples, aspects of the operations of 1515 may be performed by a transmission beam component as described with reference to FIGS. 4 through 7.

At 1520, the UE may transmit the SRS signal using the SRS transmission beam. The operations of 1520 may be performed according to the methods described herein. In some examples, aspects of the operations of 1520 may be performed by an SRS signal component as described with reference to FIGS. 4 through 7.

Figure 16:
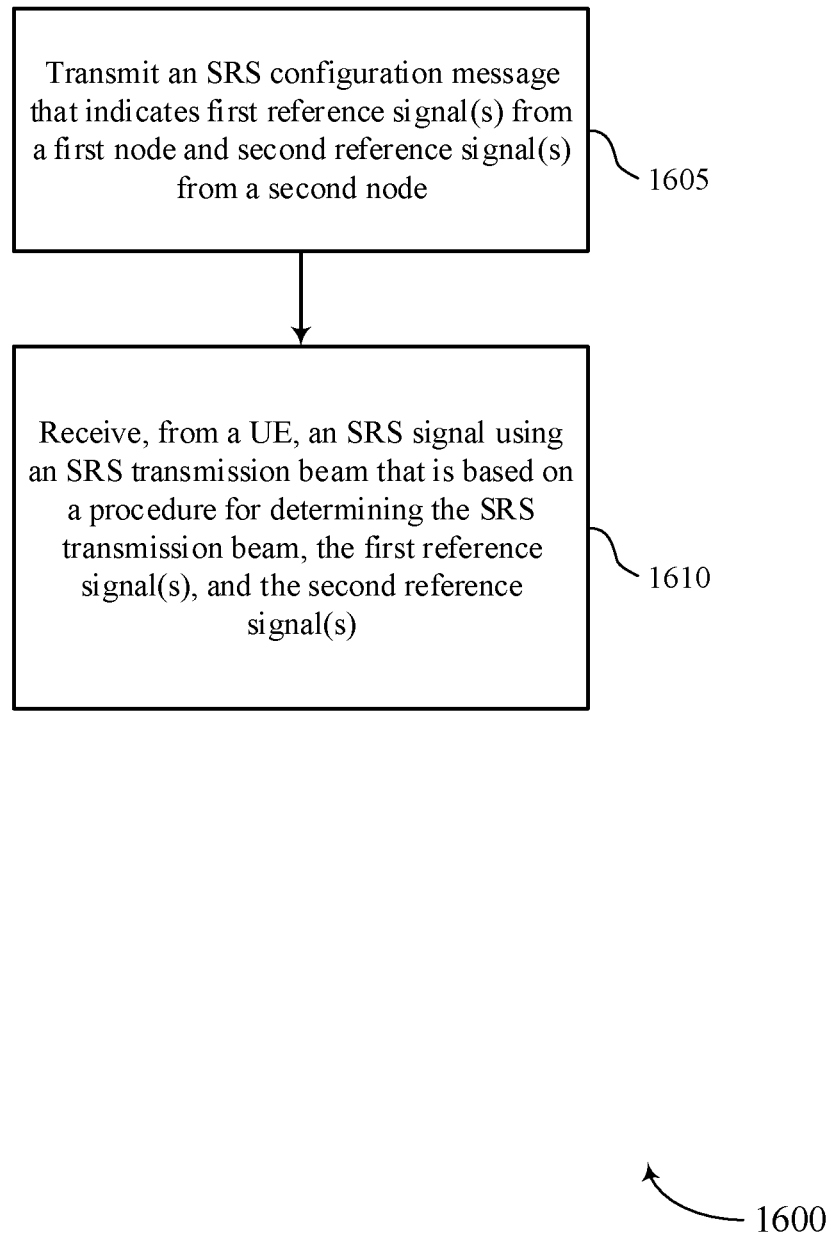

FIG. 16 shows a flowchart illustrating a method 1600 that supports SRS configuration in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may transmit an SRS configuration message that indicates one or more first reference signals from a first node and one or more second reference signals from a second node. The operations of 1605 may be performed according to the methods described herein. In some examples, aspects of the operations of 1605 may be performed by an SRS configuration module as described with reference to FIGS. 8 through 11.

At 1610, the base station may receive, from a UE, an SRS signal using an SRS transmission beam that is based on a procedure for determining the SRS transmission beam, the one or more first reference signals, and the one or more second reference signals. The operations of 1610 may be performed according to the methods described herein. In some examples, aspects of the operations of 1610 may be performed by an SRS signal receiver as described with reference to FIGS. 8 through 11.

Figure 17:
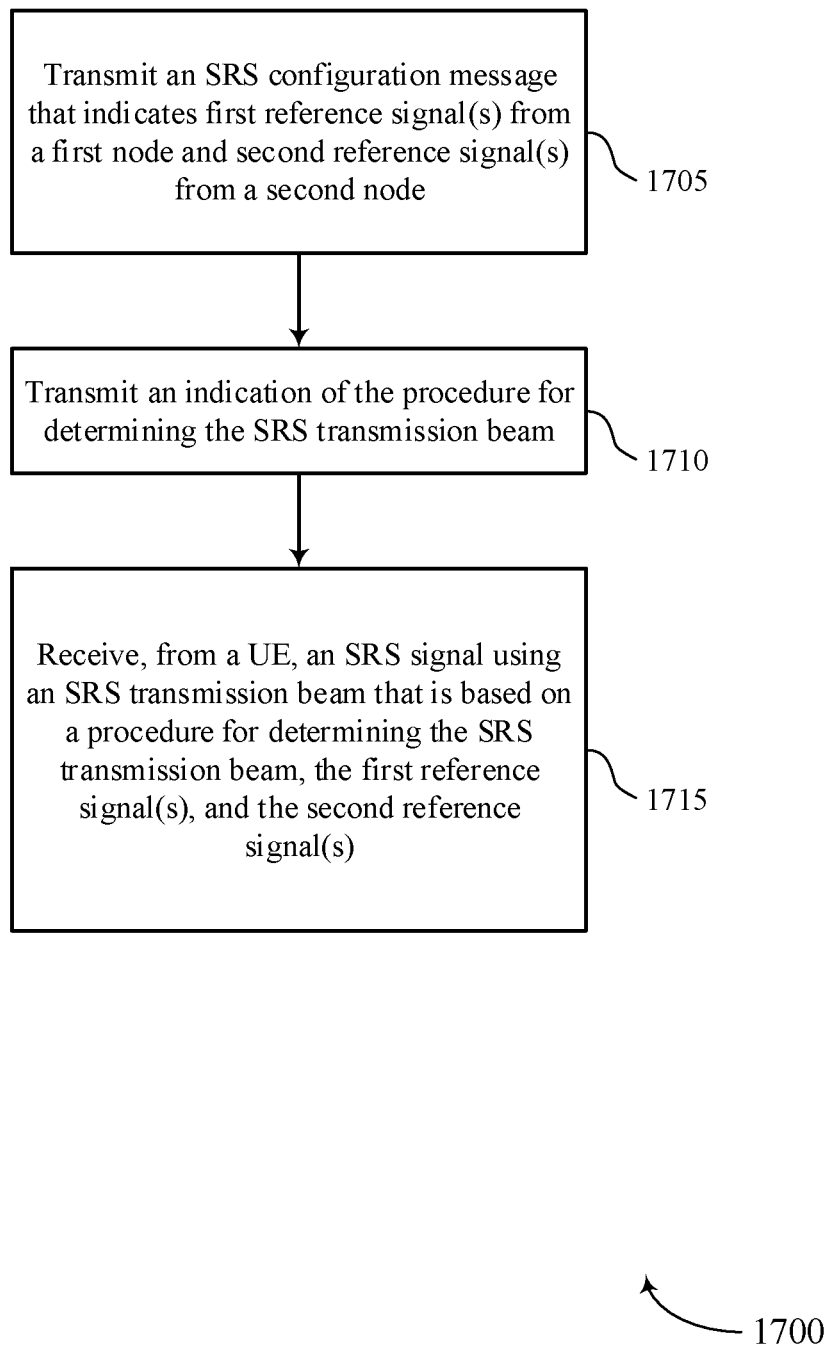

FIG. 17 shows a flowchart illustrating a method 1700 that supports SRS configuration in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1705, the base station may transmit an SRS configuration message that indicates one or more first reference signals from a first node and one or more second reference signals from a second node. The operations of 1705 may be performed according to the methods described herein. In some examples, aspects of the operations of 1705 may be performed by an SRS configuration module as described with reference to FIGS. 8 through 11.

At 1710, the base station may transmit an indication of the procedure for determining the SRS transmission beam. The operations of 1710 may be performed according to the methods described herein. In some examples, aspects of the operations of 1710 may be performed by a beam determination procedure module as described with reference to FIGS. 8 through 11.

At 1715, the base station may receive, from a UE, an SRS signal using an SRS transmission beam that is based on a procedure for determining the SRS transmission beam, the one or more first reference signals, and the one or more second reference signals. The operations of 1715 may be performed according to the methods described herein. In some examples, aspects of the operations of 1715 may be performed by an SRS signal receiver as described with reference to FIGS. 8 through 11.

Figure 18:
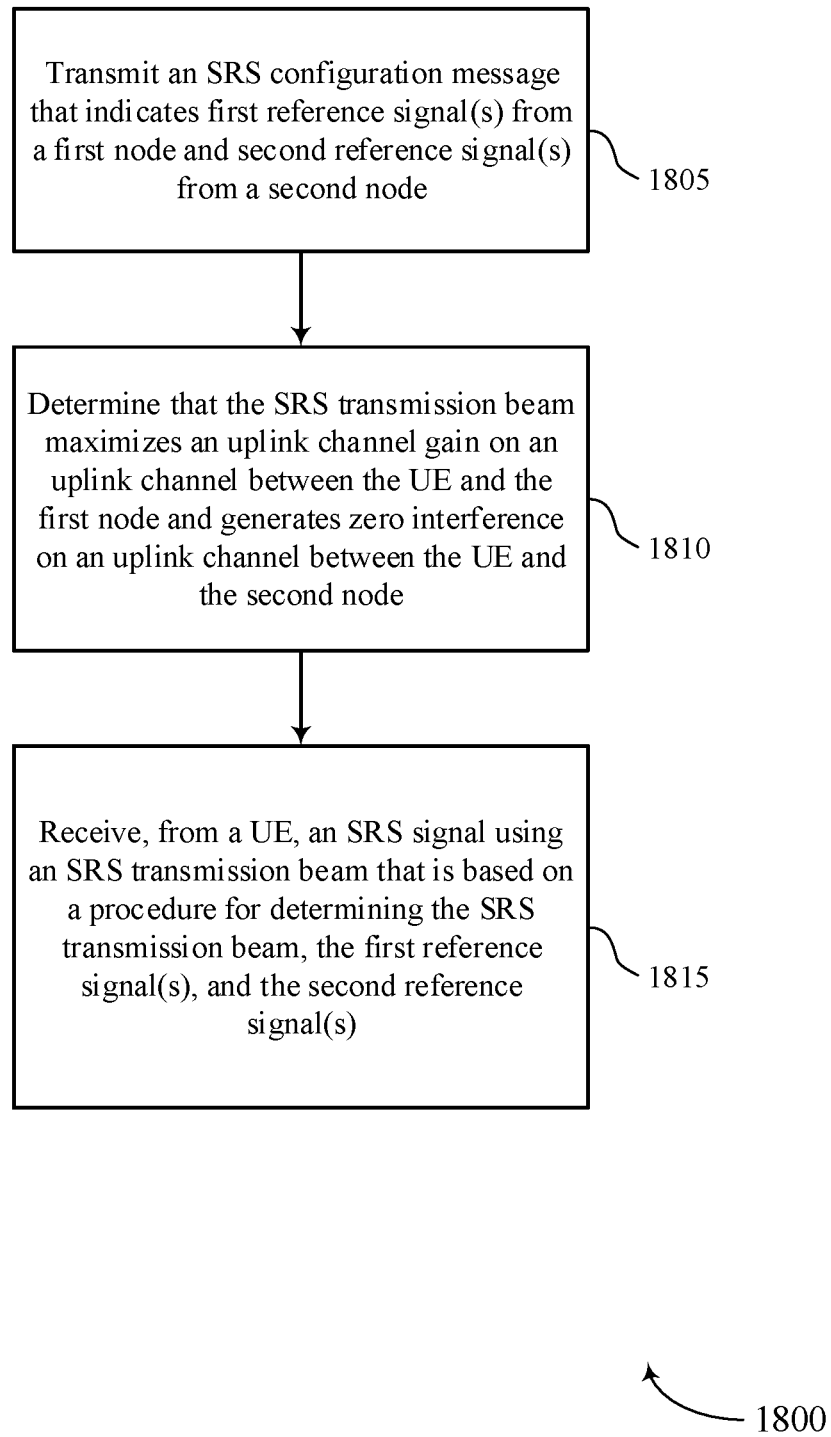

FIG. 18 shows a flowchart illustrating a method 1800 that supports SRS configuration in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1805, the base station may transmit an SRS configuration message that indicates one or more first reference signals from a first node and one or more second reference signals from a second node. The operations of 1805 may be performed according to the methods described herein. In some examples, aspects of the operations of 1805 may be performed by an SRS configuration module as described with reference to FIGS. 8 through 11.

At 1810, the base station may determine that the SRS transmission beam maximizes an uplink channel gain on an uplink channel between the UE and the first node and generates zero interference on an uplink channel between the UE and the second node. The operations of 1810 may be performed according to the methods described herein. In some examples, aspects of the operations of 1810 may be performed by a beam determination procedure module as described with reference to FIGS. 8 through 11.

At 1815, the base station may receive, from a UE, an SRS signal using an SRS transmission beam that is based on a procedure for determining the SRS transmission beam, the one or more first reference signals, and the one or more second reference signals. The operations of 1815 may be performed according to the methods described herein. In some examples, aspects of the operations of 1815 may be performed by an SRS signal receiver as described with reference to FIGS. 8 through 11.

Figure 19:
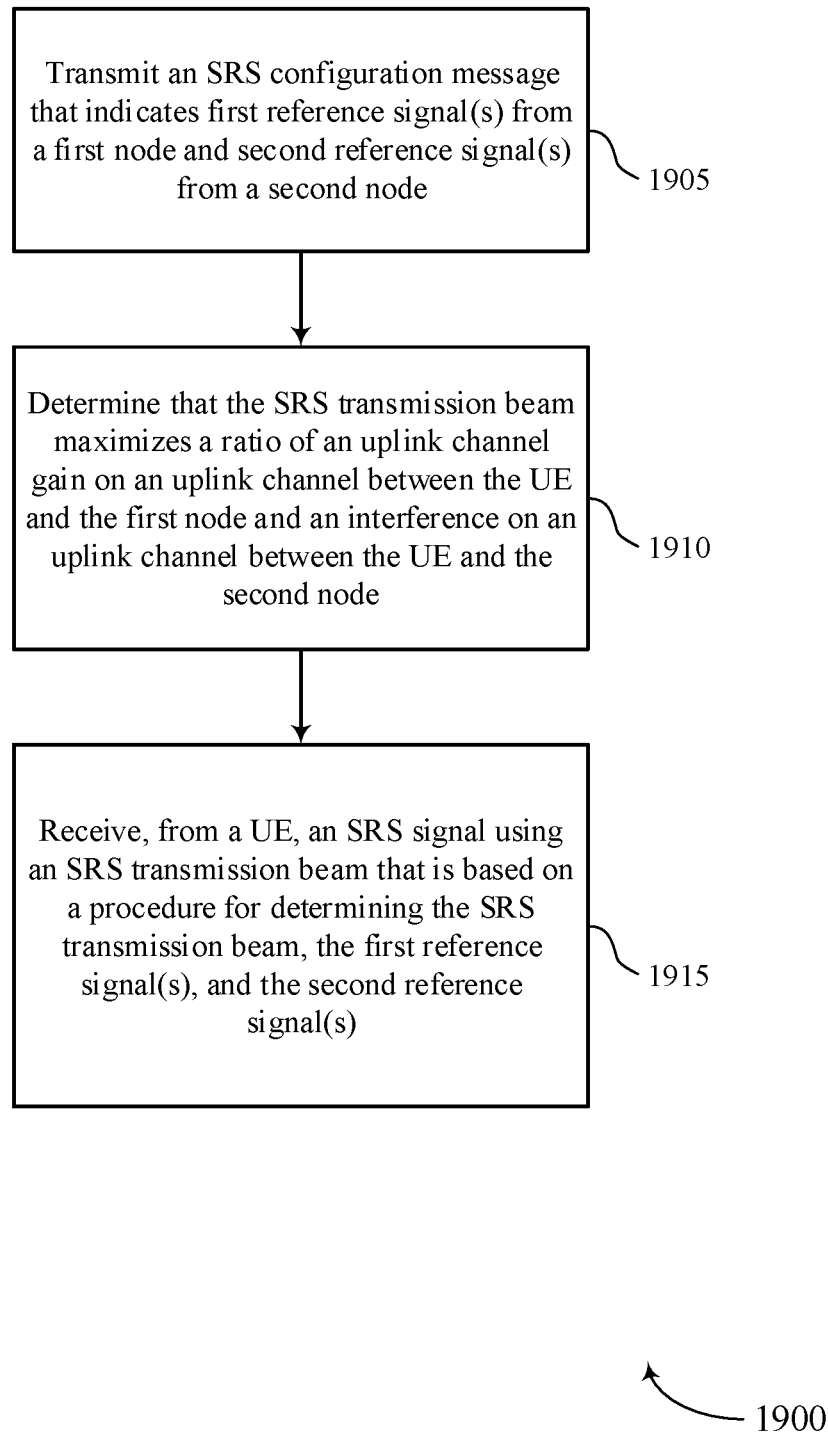

FIG. 19 shows a flowchart illustrating a method 1900 that supports SRS configuration in accordance with aspects of the present disclosure. The operations of method 1900 may be implemented by a base station 105 or its components as described herein. For example, the operations of method 1900 may be performed by a communications manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1905, the base station may transmit an SRS configuration message that indicates one or more first reference signals from a first node and one or more second reference signals from a second node. The operations of 1905 may be performed according to the methods described herein. In some examples, aspects of the operations of 1905 may be performed by an SRS configuration module as described with reference to FIGS. 8 through 11.

At 1910, the base station may determine that the SRS transmission beam maximizes a ratio of an uplink channel gain on an uplink channel between the UE and the first node and an interference on an uplink channel between the UE and the second node. The operations of 1910 may be performed according to the methods described herein. In some examples, aspects of the operations of 1910 may be performed by a beam determination procedure module as described with reference to FIGS. 8 through 11.

At 1915, the base station may receive, from a UE, an SRS signal using an SRS transmission beam that is based on a procedure for determining the SRS transmission beam, the one or more first reference signals, and the one or more second reference signals. The operations of 1915 may be performed according to the methods described herein. In some examples, aspects of the operations of 1915 may be performed by an SRS signal receiver as described with reference to FIGS. 8 through 11.

Figure 20:
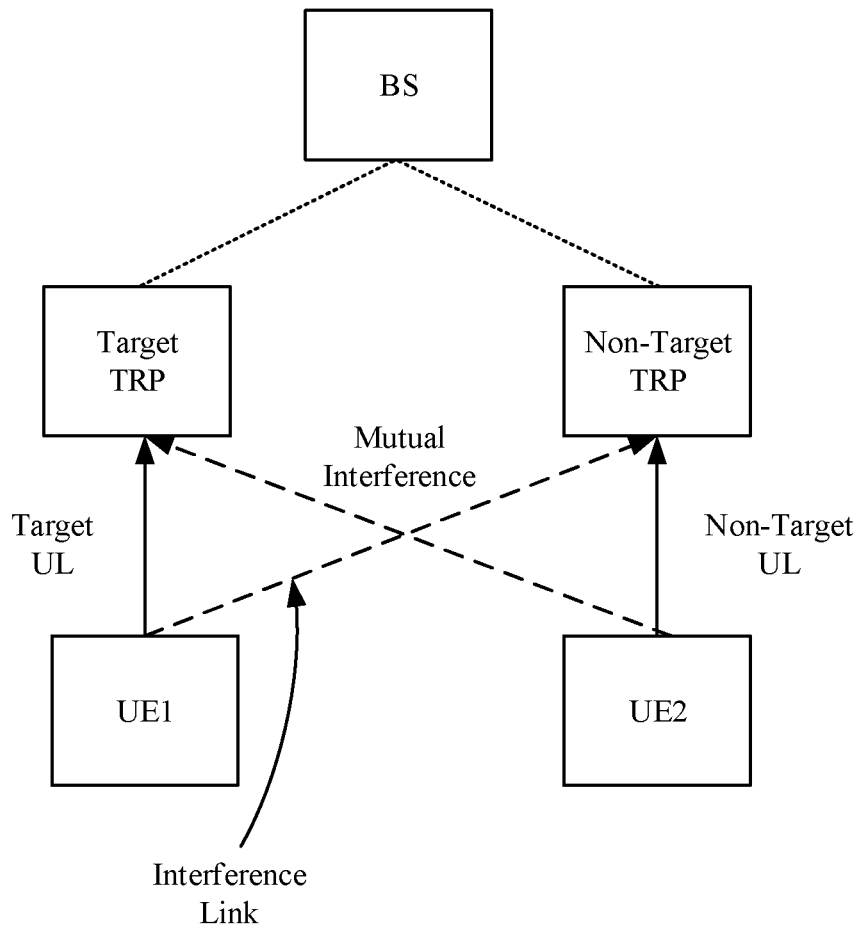
FIG. 20 shows a diagram illustrating an example of mutual interference, in accordance with various aspects of the present disclosure.

FIG. 20 shows a diagram illustrating an example 2000 of mutual interference. As shown in FIG. 20, example 2000 may include a plurality of TRPs. The TRPs may be TRPs of the same base station or may be TRPs of different BSs. As further shown in FIG. 20, example 2000 may include a plurality of UEs. In some cases, each UE (e.g., UE1, UE2, and so on) may be capable of communicating with one of the TRPs. In some cases, a UE may be capable of communicating with two or more of the TRPs, which may be referred to as a multi-TRP configuration. In this case, the base station communicatively connects with two or more of the TRPs (which may be geographically distributed), and the base station may separately or jointly transmit communications to one or more of the UEs and/or may separately or jointly receive signals from one or more of the UEs via the two or more TRPs. This increases transmit diversity, increases system capacity, and/or increases cell coverage for the base station and the UEs.

In some cases, the base station may schedule a UE to transmit an uplink communication to a TRP via an uplink scheduling grant, such as a format 0_1 DCI communication. The uplink scheduling grant may indicate an uplink beam on which the UE is to transmit the uplink communication, may indicate a time-frequency resource in which to transmit the uplink communication, and/or the like. The base station may determine one or more parameters for the uplink beam (e.g., beam direction, beam weight, and/or the like), and one or more parameters for the transmission of the uplink communication (e.g., resource assignment, transport format, modulation coding scheme, quantity of layers, and/or the like), based at least in part on one or more SRSs transmitted by the UE. The base station may determine the one or more parameters for the uplink beam based at least in part on channel gains of the one or more SRSs (e.g., by selecting the parameters based at least in part on the SRS transmission beams for the SRS with the highest channel gains).

In some cases, the base station may configure SRS resources for transmission of the one or more SRSs in radio resource control (RRC) signaling. The RRC signaling may include an SRS resource configuration, which may include SRS spatial relation information (SRS-SpatialRelationInfo). In some cases, if the SRS resource configuration identifies an SRS resource, the UE may transmit an SRS on the SRS transmission beam associated with the SRS resource. If the SRS resource configuration identifies a reference signal index (e.g., an SSB index, a channel state information reference signal (CSI-RS) index, a demodulation reference signal (DMRS) index, and/or the like) for an SRS resource, the UE may use the SRS transmission beam, that is used to receive the reference signal to which the reference signal index is assigned, to transmit the SRS.

In some cases, a base station may configure UE1 to transmit an uplink communication to a target TRP (e.g., a TRP that is the intended or target recipient of the uplink communications) on a target uplink during the same time-frequency resource in which UE2 is scheduled to transmit another uplink communication to a non-target TRP (e.g., a TRP that is not the target TRP of UE1) on a non-target uplink. While this may increase spectrum efficiency and throughput, if UE1 and UE2 separately transmit uplink communications in the same time-frequency resource to different TRPs without uplink beam coordination, the uplink communications may cause mutual interference at the TRPs.

Mutual interference may refer to the interference with the uplink communication transmitted by UE2 to the non-target TRP caused by transmission of the uplink communication from UE1 to the target TRP, and the interference with the uplink communication transmitted by UE1 to the target TRP caused by transmission of the uplink communication from UE2 to the non-target TRP. Mutual interference may be represented as an interference link, which may be an access link between a UE and a non-target TRP that causes interference on a target uplink between another UE and the non-target TRP (which is the target TRP for the UE). Mutual interference may result in poor or reduced reception performance for the TRPs, which in turn can cause decoding errors, dropped uplink communications, an increase in uplink retransmissions, and/or the like.

As indicated above, FIG. 20 is provided as an example. Other examples may differ from what is described with regard to FIG. 20.

In some cases, determining an uplink beam (e.g., an SRS transmission beam) for an uplink communication based at least in part on an SRS resource configuration may result in an increase in mutual interference if the SRS resource configuration considers the channel gain on a target link to a target TRP of a UE. By considering the target link to the target TRP, the UE can transmit an uplink communication on an SRS transmission beam that can enhance the channel gain of the target link. However, the transmission of the uplink communication using an SRS transmission beam that is determined without consideration of the interference caused to uplink communication reception at non-target TRPs may cause an increase in mutual interference with the non-target uplinks of the non-target TRPs, which may lead to weak reception performance (e.g., low SINR) of uplink communications received by the non-target TRPs during the same time-frequency resource in which the uplink communication is transmitted by the UE.

Some aspects described herein provide techniques and apparatuses for interference-based SRS beam determination. In some aspects, a base station may configure an SRS resource configuration that indicates an SRS resource for transmitting an SRS to a target TRP. A UE may receive the SRS resource configuration and may determine an SRS transmission beam for transmitting the SRS in the SRS resource. The UE may be configured to determine the SRS transmission beam based at least in part on one or more SRS transmission beams associated with the target TRP and one or more reference signals transmitted from one or more non-target TRPs. In this way, the UE considers the channel gain on the target uplink to the target TRP as well as estimated or measured interference (e.g., mutual interference) that transmission on the target uplink may cause to the non-target TRPs (e.g., based at least in part on the one or more reference signals), which reduces mutual interference for the non-target TRPs while increasing channel gain on the target uplink. Moreover, the UE may determine the current SRS transmission beam by reusing the previous SRS transmission beams associated with the target TRP to the extent possible, which conserves energy and processing resources of the UE and reduces latency relative to remeasuring or re-sweeping the reference signal(s) of the target TRP to regenerate the SRS transmission beams of the target TRP.

Figure 21:
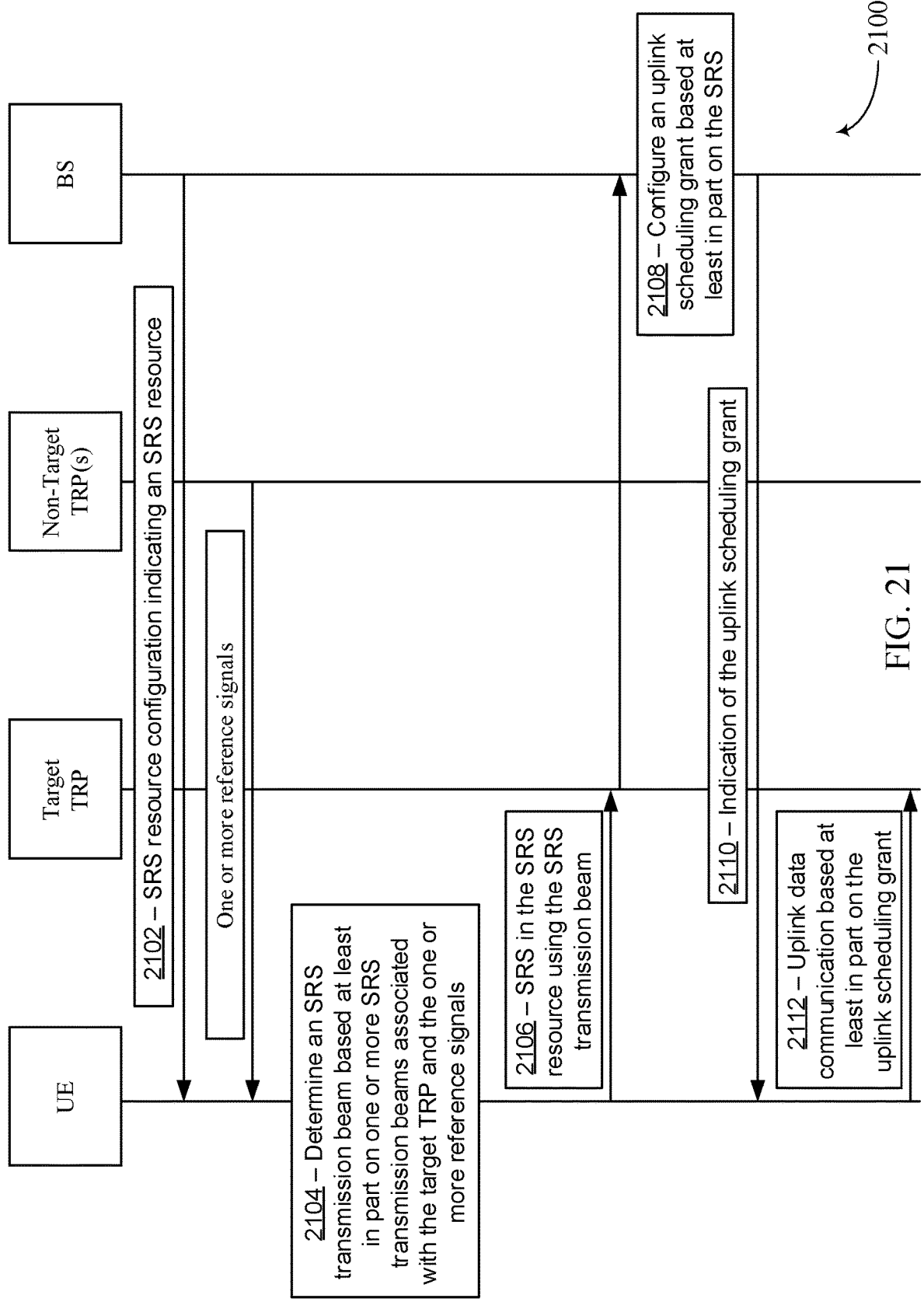
FIG. 21 is a diagram illustrating one or more examples of interference-based SRS beam determination, in accordance with various aspects of the present disclosure.

FIG. 21 is a diagram illustrating one or more examples 2100 of interference-based SRS beam determination, in accordance with various aspects of the present disclosure. As shown in FIG. 21, example(s) 2100 may include communication between a UE (e.g., UE 115) and a base station (e.g., base station 105). In some aspects, the base station may be communicatively connected with a plurality of TRPs in a multi-TRP configuration. In some aspects, the UE and the base station may be included in a wireless network, such as wireless network 100. In some aspects, the TRPs may include a target TRP and one or more non-target TRPs. The target TRP may be a TRP to which the UE is to transmit one or more uplink communications on a target uplink. The non-target TRP(s) may be TRP(s) that are different from the target TRP, and for which the UE is not scheduled or configured to transmit uplink communications.

In some aspects, the base station may transmit an uplink scheduling grant to the UE to configure the UE to transmit an uplink communication (e.g., an uplink data communication on a physical uplink shared channel (PUSCH), an uplink control communication on a physical uplink control channel (PUCCH), and/or the like) to the target TRP. The uplink scheduling grant may identify an uplink beam on which to transmit the uplink communication, may identify a time-frequency resource in which to transmit the uplink communication, and/or the like.

As shown in FIG. 21, and by reference number 2102, to select an uplink beam for an uplink scheduling grant, the base station may transmit an SRS resource configuration to the UE. The SRS resource configuration may indicate an SRS resource in which to transmit an SRS to the target TRP on the target uplink. The SRS resource may include an uplink time-frequency resource, which may include one or more slots, one or more symbols, one or more resource blocks, one or more resource elements, and/or the like.

In some aspects, the base station may transmit the SRS resource configuration to the UE via a target downlink of the target TRP. In some aspects, the base station may transmit the SRS resource configuration to the UE in one or more RRC communications, in one or more DCI communications, in one or more medium access control-control element (MAC-CE) communications, and/or other types of downlink communications.

As further shown in FIG. 21, and by reference number 2104, the UE may determine an SRS transmission beam for transmitting the SRS in the SRS resource. In some aspects, the UE may determine the SRS transmission beam based at least in part on one or more SRS transmission beams associated with the target TRP and one or more reference signals transmitted by the one or more non-target TRPs. In some aspects, the one or more SRS beams associated with the target TRP and/or the one or more reference signals transmitted by the one or more non-target TRPs may be indicated in the SRS resource configuration. The one or more SRS beams associated with the target TRP and/or the one or more reference signals transmitted by the one or more non-target TRPs may be indicated in another downlink communication, may be indicated in system information (e.g., a system information block (SIB), a master information block (MIB), a remaining minimum system information (RMSI) communication, other system information (OSI) communication, and/or the like), and/or the like.

In some aspects, the one or more SRS transmission beams associated with the target TRP may be existing or previously determined SRS transmission beams for one or more other SRS resources configured for the target TRP. Each of the other SRS resource(s) may be associated with one or more SRS ports (e.g., antenna ports). Accordingly, each of the one or more SRS ports may be associated with and/or may represent a respective SRS transmission beam of the one or more SRS transmission beams. In some aspects, the UE may determine or generate the one or more SRS transmission beams associated with the target TRP based at least in part on determining respective sets of beamforming weights for each of the one or more SRS transmission beams and generating an SRS beam of the one or more SRS transmission beams associated with the target TRP based at least in part on a set of beamforming weights for the SRS transmission beam and an SRS port, of the one or more SRS ports, associated with the SRS transmission beam.

In some aspects, the one or more reference signals may be SSBs transmitted by the one or more non-target TRPs, CSI-RSs transmitted by the one or more non-target TRPs, one or more DMRSs transmitted by the one or more non-target TRPs, and/or other types of measurement resources transmitted by the one or more non-target TRPs. In some aspects, the one or more non-target TRPs may transmit the reference signals after the base station transmits the SRS resource configuration and/or concurrently with transmission of the SRS resource configuration. In some aspects, the UE may determine the SRS transmission beam for the SRS by determining respective channel response matrixes for each of the one or more reference signals. The channel response matrix for a reference signal may represent the channel gain of the interference link associated with the non-target TRP that transmitted the reference signal. In this case, the channel gain of the interference link corresponds to the mutual interference between the UE and the non-target TRP.

In some aspects, the UE may determine the SRS transmission beam based at least in part on one or more SRS transmission beam parameters, in addition to the one or more SRS transmission beams associated with the target TRP and the one or more reference signals transmitted by the non-target TRPs. The SRS transmission beam parameters may specify rules, criteria, and/or parameters that dictate how the UE determines the SRS transmission beam based at least in part on the one or more SRS transmission beams associated with the target TRP and the one or more reference signals transmitted by the non-target TRPs.

In some aspects, the UE may receive an indication of the one or more SRS transmission beam parameters in the SRS resource configuration. In some aspects, the UE may receive an indication of the one or more SRS transmission beam parameters in another downlink communication or system information. In some aspects, the one or more SRS transmission beam parameters may be hard-coded, programmed, or configured at the UE in a memory (e.g., memory), in a table, in a specification, and/or the like based at least in part on a standard.

In some aspects, the one or more SRS transmission beam parameters may indicate that the UE is to determine the SRS transmission beam in a manner that maximizes reusage of the one or more SRS transmission beam associated with the target TRP, and reduces or eliminates the interference strengths of the interference links between the UE and the one or more non-target TRPs. For example, the one or more SRS transmission beam parameters may include a first parameter indicating that the UE is to select the SRS transmission beam from the one or more SRS transmission beams associated with the target TRP.

Alternatively, the first parameter may indicate that, if the UE determines the SRS transmission beam to be an SRS transmission beam that is different from the one or more SRS transmission beams associated with the target TRP, then the beam correlation between the determined SRS transmission beam and at least one of the one or more SRS transmission beams associated with the target TRP is to satisfy a beam correlation threshold (e.g., 80% correlation, 90% correlation, and/or the like). Thus, if an SRS transmission of the one or more SRS transmission beams associated with the target TRP is denoted as a column vector v, and the SRS transmission beam determined by the UE is denoted as a column vector u, the UE may determine the SRS transmission beam such that the value of $|u^H v|$ (where $u^H$ is the Hermitian of the column vector u) is maximized and/or satisfies a threshold value corresponding to the beam correlation threshold. In this way, the first parameter ensures that the determined SRS transmission beam and at least one of the one or more SRS transmission beams associated with the target TRP have a large beam correlation. As an example, the beam correlation threshold is 100% correlation, which means the determined SRS transmission beam is selected from the one or more SRS transmission beams associated with the target TRP.

As another example, the one or more SRS transmission parameters may include a second parameter indicating that the UE is to determine the SRS transmission beam such that the SRS transmission beam is to generate zero interference strength on the access links (e.g., non-target uplinks) associated with the one or more non-target TRPs. In some aspects, zero interference strength to an access link may refer to projection powers of the transmission beam weight vectors on the signal-subspace of the channel response matrixes of non-target TRPs being equal to zero.

In some aspects, the UE may determine the SRS transmission beam such that the SRS transmission beam results in zero interference strength to an access link of a non-target TRP in a 5G NR frequency range 1 (FR1) deployment, where the UE communicates with the target TRP using a sub-6 GHz frequency. In some aspects, the UE may perform a received signal strength measurement of the reference signal transmitted by the non-target TRP (which may indicate the beamformed downlink channel gain on the non-target downlink of the access link), and may determine the uplink channel response matrix for access link based at least in part on channel reciprocity between the non-target downlink and the non-target uplink of the access link. The uplink channel response matrix may be denoted as $H_{12}$. The UE may determine an orthogonal projection matrix of the uplink channel response matrix $H_{12}$. The orthogonal projection matrix may be denoted as $P_{12}$. The UE may determine the orthogonal projection matrix $P_{12}$ such that, for any matrix A having a quantity of rows equal to the number of columns as $H_{12}$, the matrix of $P_{12}A$ is orthogonal to $H_{12}$. The UE may determine a projection of a beamforming weight vector, of an SRS transmission beam (denoted as column vector v) of the one or more SRS transmission beams associated with the target TRP, onto the orthogonal projection matrix $P_{12}$. The UE may determine the projection of the beamforming weight vector that results in column vector u, such that column vector $u=P_{12}v$.

Alternatively, the second parameter may indicate that the UE is to determine the SRS transmission beam such that the interference strength of the SRS transmission beam for the access links (e.g., non-target uplinks) associated with the one or more non-target TRPs satisfies an interference strength threshold (e.g., −90 dBm, or 10 dB smaller than the channel gain of the access links associated with the one or more non-target TRPs). Thus, based at least in part on the second parameter, the UE may determine the SRS transmission beam such that the SRS transmission beam has a sufficiently small projection power on the signal-subspace of the channel response matrixes of non-target TRPs and/or or has a sufficiently large projection power on the null-subspace of the channel response matrixes of non-target TRPs.

In some aspects, the UE may determine the interference strength on an access link associated with a non-target TRP by determining a beamformed downlink channel gain on a non-target downlink associated with the non-target TRP. The UE may determine the interference strength of the SRS transmission beam based at least in part on reciprocity between the interference strength of the SRS transmission beam and the beamformed downlink channel gain on the non-target downlink associated with the non-target TRP. The UE may determine whether the interference strength of the SRS transmission satisfies the interference strength threshold indicated in the one or more SRS transmission beam parameters.

In some aspects, the UE may determine the beamformed downlink channel gain on the access links associated with the non-target TRP by identifying a transmission power for the reference signal(s) transmitted by the non-target TRP and determining the beamformed downlink channel gain based at least in part on the transmission power of the reference signal(s). In some aspects, the UE may identify the transmission power for the reference signal(s) based at least in part on an indication of the transmission power in the SRS resource configuration, based at least in part on an indication of the transmission power in another downlink communication or system information received from the BS, based at least in part on the transmission power being indicated in a specification or standard and programmed or configured for the UE, and/or the like.

In some aspects, the UE may determine the SRS transmission beam in a 5G NR frequency range 2 (FR2) configuration (e.g., where the UE communicates with the target TRP using a millimeter wave (mmWave) frequency). In this case, the UE may determine correlation coefficients between one or more reference SRS transmission beams and the one or more SRS transmission beams associated with the target TRP. The UE may determine one or more downlink beams based on the one or more reference SRS transmission beams. The UE may beam sweep the one or more downlink beams to receive the one or more reference signals transmitted from the one or more non-target TRPs. The UE may determine respective beamformed downlink channel gains for each of the one or more downlink beams based at least in part on the one or more reference signals. The UE may determine respective uplink interference strengths for the one or more reference SRS transmission beams based at least in part on the respective beamformed downlink channel gains and reciprocity between the one or more reference SRS transmission beams and the one or more downlink beams. The UE may determine the SRS transmission beam based at least in part on the respective uplink interference strengths and the respective correlation coefficients for the one or more reference SRS transmission beams.

As further shown in FIG. 21, and by reference number 2106, the UE may transmit the SRS in the SRS resource indicated in the SRS resource configuration. Moreover, the UE may transmit the SRS using the SRS transmission beam determined by the UE (e.g., based at least in part on the one or more SRS transmission beams associated with the target TRP, the one or more reference signals transmitted by the one or more non-target TRPs, and/or the one or more SRS transmission beam parameters). The target TRP may relay, forward, and/or provide information associated with the SRS to the BS, such as the SRS transmission beam on which the SRS was transmitted.

As further shown in FIG. 21, and by reference number 2108, the base station may configure an uplink scheduling grant for transmission of an uplink data communication. In some aspects, the base station may configure the uplink scheduling grant based at least in part on the SRS, the SRS transmission beam on which the SRS was transmitted, and/or the like. The uplink scheduling grant may identify a time-frequency resource in which to transmit the uplink data communication, may identify an uplink beam on which to transmit the uplink data communication, and/or the like. In some aspects, the uplink beam may be the SRS transmission beam on which the UE transmitted the SRS to the target TRP.

As further shown in FIG. 21, and by reference number 2110, the base station may transmit the uplink scheduling grant to the UE. In some aspects, the base station may transmit the uplink scheduling grant via the target TRP. In this case, the UE may receive the uplink scheduling grant from the target TRP via the target downlink associated with the target TRP.

As further shown in FIG. 21, and by reference number 2112, the UE may transmit the uplink data communication to the target TRP based at least in part on the uplink scheduling grant. For example, the UE may transmit the uplink data communication in the time-frequency resource indicated in the uplink scheduling grant, may transmit the uplink data communication using the uplink beam (e.g., the SRS transmission beam) indicated in the uplink scheduling grant, and/or the like.

In this way, the UE may be configured to determine the SRS transmission beam based at least in part on one or more SRS transmission beams associated with the target TRP and one or more reference signals transmitted from one or more non-target TRPs. Accordingly, the UE considers the channel gain on the target uplink to the target TRP as well as estimated or measured interference (e.g., mutual interference) that transmission on the target uplink may cause to the non-target TRPs (e.g., based at least in part on the one or more reference signals), which reduces mutual interference for the non-target TRPs while increasing channel gain on the target uplink. Moreover, the UE may determine the current SRS transmission beam by reusing the previous SRS transmission beams associated with the target TRP to the extent possible, which conserves energy and processing resources of the UE and reduces latency relative to remeasuring or re-sweeping the reference signal(s) of the target TRP to regenerate the SRS transmission beams of the target TRP.

As indicated above, FIG. 21 is provided as one or more examples. Other examples may differ from what is described with respect to FIG. 21.

Figure 22:
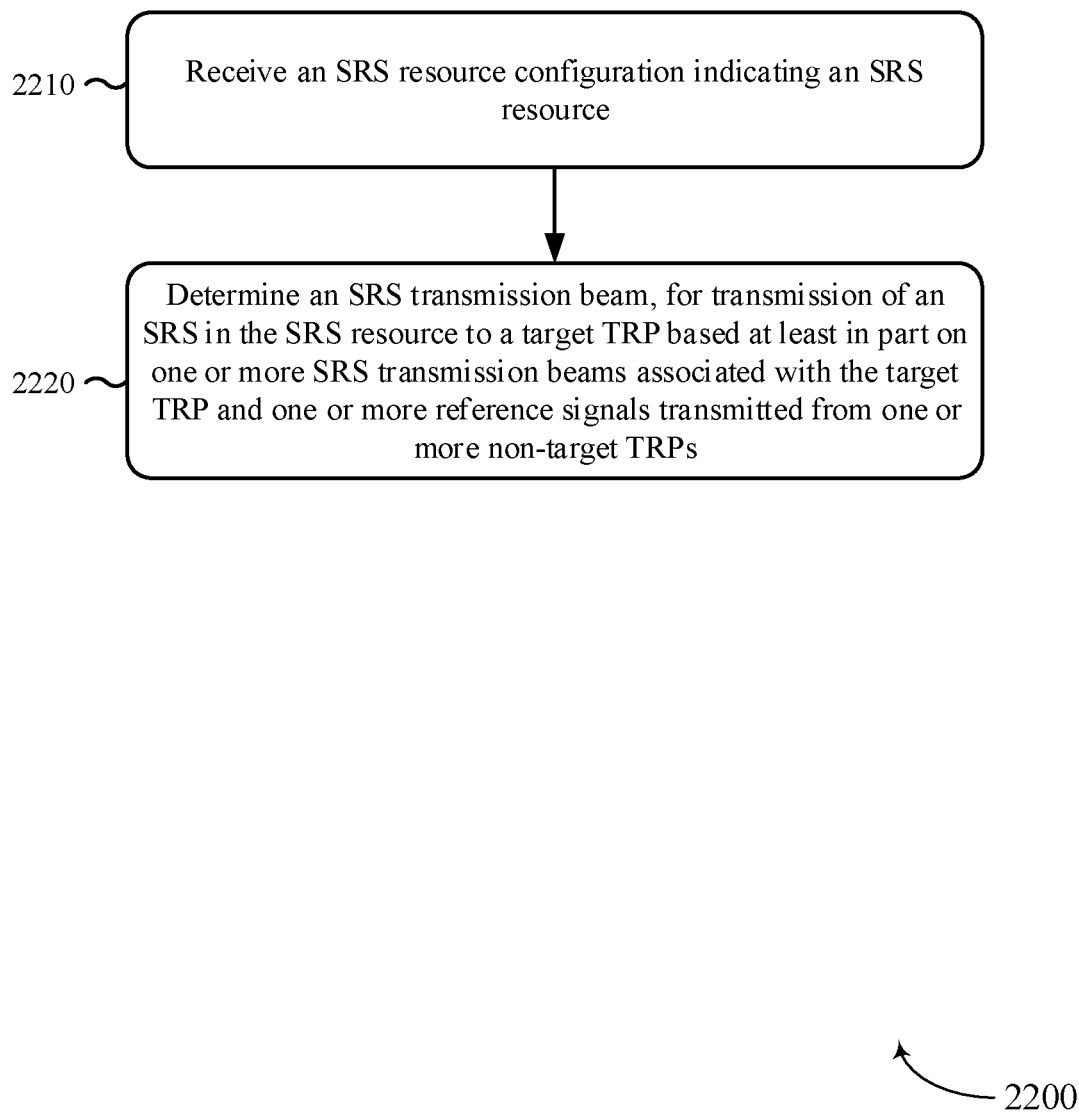
FIG. 22 is a diagram illustrating an example process performed, for example, by a user equipment (UE), in accordance with various aspects of the present disclosure.

FIG. 22 is a diagram illustrating an example process 2200 performed, for example, by a UE, in accordance with various aspects of the present disclosure. Example process 2200 is an example where the UE (e.g., UE 115 depicted and described in connection with FIGS. 1 and/or 2, UE1 or UE2 depicted and described in connection with FIG. 20, the UE depicted and described in connection with FIG. 21, the apparatus 2302 depicted and described in connection with FIG. 23, the apparatus 2302' depicted and described in connection with FIG. 24, and/or the like) performs operations associated with interference-based SRS beam determination.

As shown in FIG. 22, in some aspects, process 2200 may include receiving an SRS resource configuration indicating an SRS resource (block 2210). For example, the UE (e.g., using receive processor, transmit processor, controller/processor, memory, and/or the like) may receive an SRS resource configuration indicating an SRS resource, as described above in connection with FIG. 21.

In some aspects, receiving the SRS resource configuration comprises receiving the SRS resource configuration in one or more RRC communications, one or more MAC-CE communications, or one or more DCI communications.

As further shown in FIG. 22, in some aspects, process 2200 may include determining an SRS transmission beam, for transmission of an SRS in the SRS resource to a target TRP, based at least in part on one or more SRS transmission beams associated with the target TRP and one or more reference signals transmitted from one or more non-target TRPs (block 2220). For example, the UE (e.g., using receive processor, transmit processor, controller/processor, memory, and/or the like) may determine an SRS transmission beam, for transmission of an SRS in the SRS resource to a target TRP, based at least in part on one or more SRS transmission beams associated with the target TRP and one or more reference signals transmitted from one or more non-target TRPs, as described above in connection with FIG. 21.

In some aspects, the one or more SRS transmission beams are associated with another, previously configured, SRS resource for the target TRP. In some aspects, the one or more SRS transmission beams are identified in the SRS resource configuration. In some aspects, the one or more reference signals are identified in the SRS resource configuration. In some aspects, the one or more reference signals comprise at least one of a CSI-RS, a DMRS, or an SSB.

In some aspects, determining the SRS transmission beam comprises determining the SRS transmission beam based at least in part on one or more SRS transmission beam parameters. In some aspects, the one or more SRS transmission beam parameters are indicated in the SRS resource configuration. In some aspects, the one or more SRS transmission beam parameters are programmed or configured at the UE and are based at least in part on a standard.

In some aspects, the one or more SRS transmission beam parameters comprise a first parameter indicating that a beam correlation between the SRS transmission beam and a reference SRS transmission beam of the one or more SRS transmission beams is to satisfy a beam correlation threshold, and a second parameter indicating that the SRS transmission beam is to generate zero interference strength on access links associated with the one or more non-target TRPs. In some aspects, the one or more SRS transmission beam parameters comprise a first parameter indicating that a beam correlation between the SRS transmission beam and a reference SRS transmission beam of the one or more SRS transmission beams is to satisfy a beam correlation threshold, and a second parameter indicating an interference strength of the SRS transmission beam for access links associated with the one or more non-target TRPs that satisfies an interference strength threshold.

In some aspects, determining the SRS transmission beam comprises determining, for a non-target TRP of the one or more non-target TRPs, an uplink channel response matrix based at least in part on a reference signal, of the one or more reference signals, transmitted from the non-target TRP; determining an orthogonal projection matrix of the uplink channel response matrix; determining a projection of a beamforming weight vector of a reference SRS transmission beam, of the one or more SRS transmission beams, associated with the target TRP onto the orthogonal projection matrix; and determining a column vector as the beamforming weight vector of the SRS transmission beam, based at least in part on the projection of the vector of the reference SRS transmission beam onto the orthogonal projection matrix.

In some aspects, determining the SRS transmission beam comprises determining respective correlation coefficients between one or more reference SRS transmission beams and the one or more SRS transmission beams; determining one or more downlink beams based on the one or more reference SRS transmission beams; sweeping the one or more downlink beams to receive the one or more reference signals; determining respective beamformed downlink channel gains for each of the one or more downlink beams based at least in part on the one or more reference signals; determining respective uplink interference strengths for the one or more reference SRS transmission beams based at least in part on the respective beamformed downlink channel gains and reciprocity between the one or more reference SRS transmission beams and the one or more downlink beams; and determining the SRS transmission beam based at least in part on the respective uplink interference strengths and the respective correlation coefficients.

Process 2200 may include additional aspects, such as any single aspect or any combination of aspects described below and/or in connection with one or more other processes described elsewhere herein.

In some aspects, process 2200 includes transmitting, to the target TRP, the SRS in the SRS resource using the SRS transmission beam; receiving an uplink scheduling grant based at least in part on the SRS; and transmitting, based at least in part on the uplink scheduling grant, an uplink data communication using the SRS transmission beam. In some aspects, process 500 includes determining respective sets of beamforming weights for each of the one or more SRS transmission beams; and generating a reference SRS transmission beam of the one or more SRS transmission beams based at least in part on: a set of beamforming weights for the reference SRS transmission beam, and an SRS port, of the one or more SRS ports, associated with the reference SRS transmission beam.

In some aspects, process 2200 includes determining respective channel response matrixes for each of the one or more reference signals based at least in part on the SRS resource configuration, and determining the SRS transmission beam comprises determining the SRS transmission beam based at least in part on the respective channel response matrixes. In some aspects, process 500 includes determining a beamformed downlink channel gain on non-target downlinks associated with the one or more non-target TRPs; determining the interference strength of the SRS transmission beam based at least in part on reciprocity between the interference strength of the SRS transmission beam and the beamformed downlink channel gain on the non-target downlinks associated with the one or more non-target TRPs; and determining whether the interference strength of the SRS transmission satisfies the interference strength threshold.

In some aspects, determining the beamformed downlink channel gain on the access links associated with the one or more non-target TRPs comprises identifying respective transmission powers for each of the one or more reference signals, and determining the beamformed downlink channel gain on the non-target downlinks associated with the one or more non-target TRPs based at least in part on the respective transmission powers for each of the one or more reference signals.

In some aspects, identifying the respective transmission powers comprises identifying the respective transmission powers based at least in part on an indication of the respective transmission powers in the SRS resource configuration. In some aspects, identifying the respective transmission powers comprises identifying the respective transmission powers based at least in part on the respective transmission powers being programmed or configured at the UE.

Although FIG. 22 shows example blocks of process 2200, in some aspects, process 2200 may include additional blocks, fewer blocks, different blocks, or differently arranged blocks than those depicted in FIG. 22. Additionally, or alternatively, two or more of the blocks of process 2200 may be performed in parallel.

Figure 23:
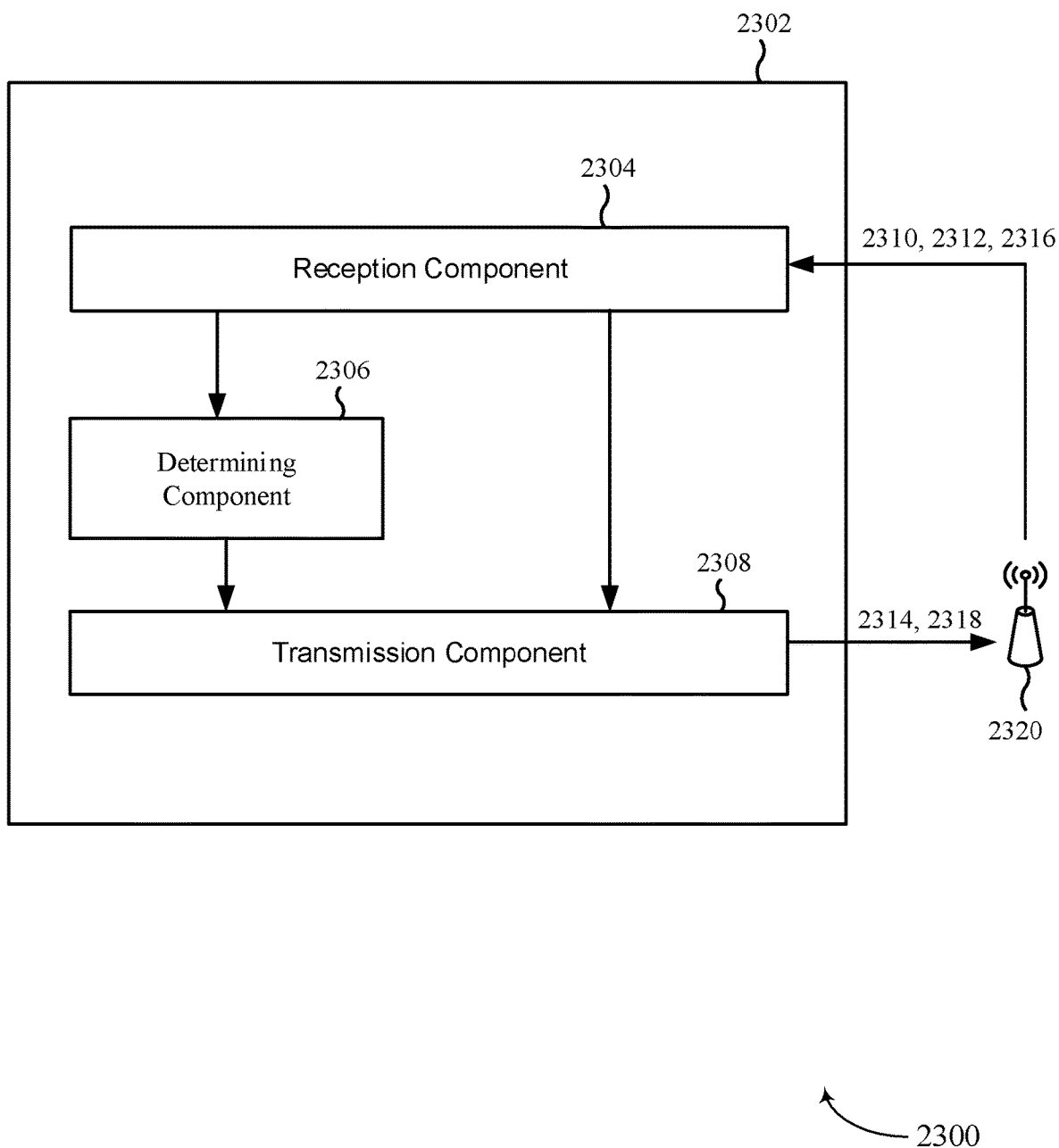
FIG. 23 is a conceptual data flow diagram illustrating an example of a data flow between different components in an example apparatus.

FIG. 23 is a conceptual data flow diagram 2300 illustrating a data flow between different components in an example apparatus 2302. The apparatus 2302 may be a UE (e.g., UE 115). In some aspects, the apparatus 2302 includes a reception component 2304, a determining component 2306, and/or a transmission component 2308.

In some aspects, reception component 2304 may receive an SRS resource configuration 2310 from a base station 2320 (e.g., base station 105). The SRS resource configuration may indicate an SRS resource for transmitting an SRS 2314. In some aspects, the determining component 2306 may determine an SRS transmission beam for transmission of the SRS 2314 in the SRS resource to a target TRP of the base station 2320. In some aspects, the determining component may determine the SRS transmission beam based at least in part on one or more SRS transmission beams associated with the target TRP and one or more reference signals 2312 transmitted from one or more non-target TRPs of the base station 2320. In some aspects, the transmission component 2308 may transmit, to the target TRP of the base station 2320, the SRS 2314 in the SRS resource using the SRS transmission beam.

In some aspects, the reception component 2304 may receive an uplink scheduling grant 2316 based at least in part on the SRS 2314. In some aspects, the transmission component 2308 may transmit, based at least in part on the uplink scheduling grant 2316, an uplink data communication 2318 using the SRS transmission beam.

In some aspects, the reception component 2304 may include an antenna, a MIMO detector, a receive processor, a controller/processor, a memory, and/or the like. In some aspects, determining component 2306 may include a receive processor, a transmit processor, a controller/processor, a memory, and/or the like. In some aspects, the transmission component 2308 may include an antenna, a TX MIMO processor, a transmit processor, a controller/processor, a memory, and/or the like.

The apparatus may include additional components that perform each of the blocks of the algorithm in the aforementioned process 2200 of FIG. 22 and/or the like. Each block in the aforementioned process 2200 of FIG. 22 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 23 are provided as an example. In practice, there may be additional components, fewer components, different components, or differently arranged components than those shown in FIG. 23. Furthermore, two or more components shown in FIG. 23 may be implemented within a single component, or a single component shown in FIG. 23 may be implemented as multiple, distributed components. Additionally, or alternatively, a set of components (e.g., one or more components) shown in FIG. 23 may perform one or more functions described as being performed by another set of components shown in FIG. 23.

Figure 24:
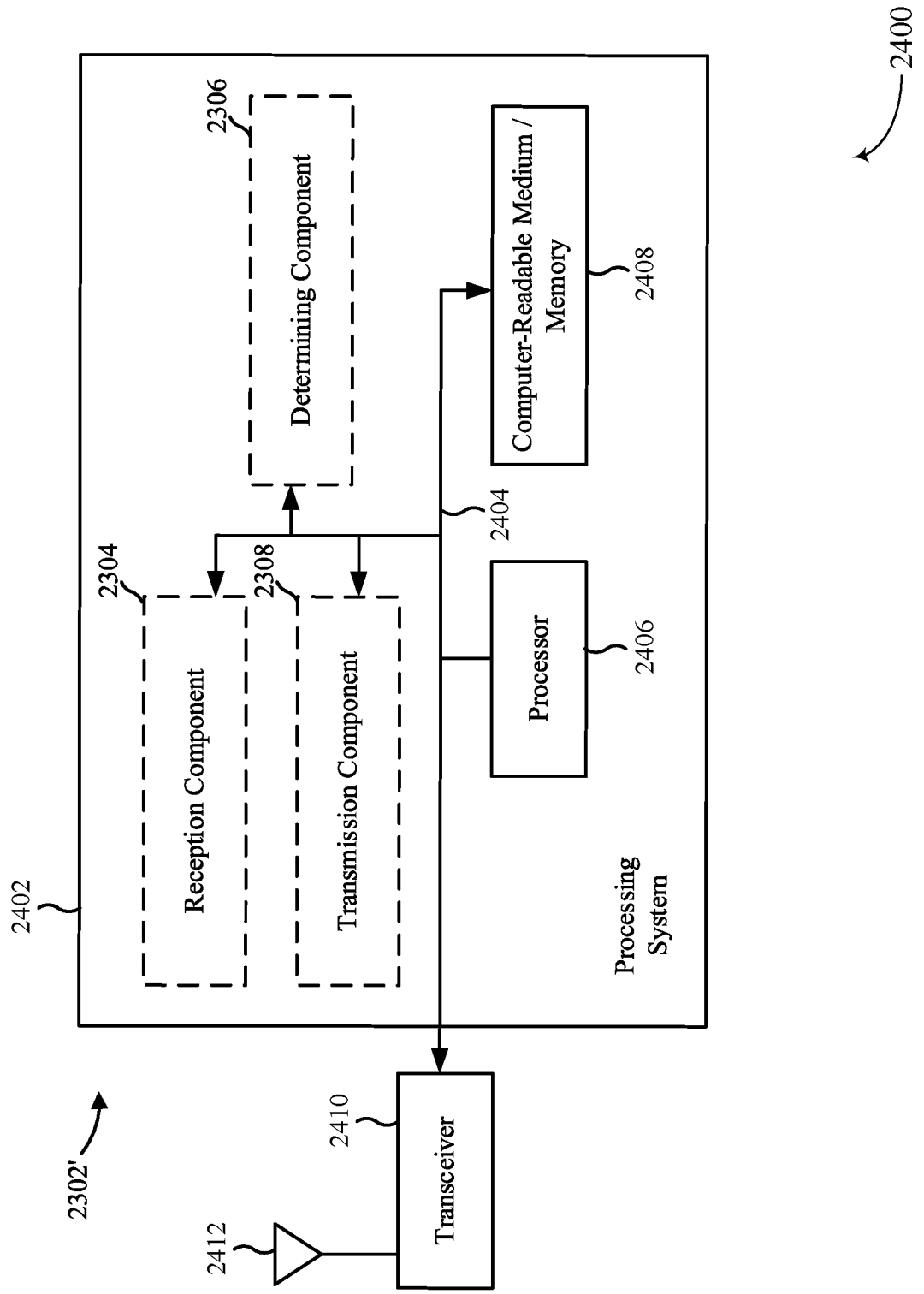
FIG. 24 is a diagram illustrating an example of a hardware implementation for an apparatus employing a processing system.

FIG. 24 is a diagram 2400 illustrating an example of a hardware implementation for an apparatus 2302' employing a processing system 2402. The apparatus 2302' may be a UE (e.g., UE 115).

The processing system 2402 may be implemented with a bus architecture, represented generally by the bus 2404. The bus 2404 may include any number of interconnecting buses and bridges depending on the specific application of the processing system 2402 and the overall design constraints. The bus 2404 links together various circuits including one or more processors and/or hardware components, represented by the processor 2406, the components 2304, 2306, 2308, and the computer-readable medium/memory 2408. The bus 2404 may also link various other circuits such as timing sources, peripherals, voltage regulators, and power management circuits, which are well known in the art, and therefore will not be described any further.

The processing system 2402 may be coupled to a transceiver 2410. The transceiver 2410 is coupled to one or more antennas 2412. The transceiver 2410 provides a means for communicating with various other apparatuses over a transmission medium. The transceiver 2410 receives a signal from the one or more antennas 2412, extracts information from the received signal, and provides the extracted information to the processing system 2402, specifically the reception component 2304. In addition, the transceiver 2410 receives information from the processing system 2402, specifically the transmission component 2308, and based at least in part on the received information, generates a signal to be applied to the one or more antennas 2412. The processing system 2402 includes a processor 2406 coupled to a computer-readable medium/memory 2408. The processor 2406 is responsible for general processing, including the execution of software stored on the computer-readable medium/memory 2408. The software, when executed by the processor 2406, causes the processing system 2402 to perform the various functions described herein for any particular apparatus. The computer-readable medium/memory 2408 may also be used for storing data that is manipulated by the processor 2406 when executing software. The processing system further includes at least one of the components 2304, 2306, and/or 2308. The components may be software modules running in the processor 2406, resident/stored in the computer readable medium/memory 2408, one or more hardware modules coupled to the processor 24023, or some combination thereof. The processing system 2402 may be a component of the UE 115 and may include the memory and/or at least one of the TX MIMO processor, the receiver processor, the receive processor, the transmit processor, and/or the controller/processor.

In some aspects, the apparatus 2302/2302' for wireless communication includes means for receiving an SRS resource configuration indicating an SRS resource, means for determining an SRS transmission beam, for transmission of an SRS in the SRS resource to a target TRP based at least in part on one or more SRS transmission beams associated with the target TRP and one or more reference signals transmitted from one or more non-target TRPs. In some aspects, the apparatus 2302/2302' for wireless communication includes means for transmitting, to the target TRP, the SRS in the SRS resource using the SRS transmission beam, means for receiving an uplink scheduling grant based at least in part on the SRS, means for transmitting, based at least in part on the uplink scheduling grant, an uplink data communication using the SRS transmission beam, and/or the like. The aforementioned means may be one or more of the aforementioned components of the apparatus 2302 and/or the processing system 2402 of the apparatus 2302' configured to perform the functions recited by the aforementioned means. As described elsewhere herein, the processing system 2402 may include the TX MIMO processor, the transmit processor, the receive processor, the MIMO detector 2523, and/or the controller/processor.

FIG. 24 is provided as an example. Other examples may differ from what is described in connection with FIG. 24.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving an SRS configuration message that indicates one or more first reference signals from a first node or one or more SRS transmission beams associated with the first node and one or more second reference signals from a second node; determining an SRS transmission beam for transmitting an SRS signal based at least in part on a procedure for determining the SRS transmission beam, the one or more first reference signals, and the one or more second reference signals; and transmitting the SRS signal using the SRS transmission beam.

Aspect 2: The method of aspect 1, further comprising: receiving an indication of the procedure for determining the SRS transmission beam.

Aspect 3: The method of any of aspects 1 through 2, wherein the procedure for determining the SRS transmission beam comprises: determining that the SRS transmission beam maximizes an uplink channel gain on an uplink channel between the UE and the first node and generates zero interference on an uplink channel between the UE and the second node.

Aspect 4: The method of any of aspects 1 through 2, wherein the procedure for determining the SRS transmission beam comprises: determining that the SRS transmission beam maximizes a ratio of an uplink channel gain on an uplink channel between the UE and the first node and an interference on an uplink channel between the UE and the second node.

Aspect 5: The method of any of aspects 1 through 4, wherein the SRS configuration message indicates an identity of a resource associated with the one or more first reference signals, the one or more second reference signals, or both.

Aspect 6: The method of any of aspects 1 through 5, wherein the SRS configuration message is received via radio resource control signaling, a medium access control layer control element, a downlink control information message, or a combination thereof.

Aspect 7: The method of any of aspects 1 through 6, wherein the one or more first reference signals or the one or more second reference signals comprise channel state information reference signals, synchronization signal block reference signals, demodulation reference signals, or a combination thereof.

Aspect 8: The method of any of aspects 1 through 7, further comprising: receiving the one or more first reference signals from the first node; and receiving the one or more second reference signals from the second node.

Aspect 9: The method of aspect 8, further comprising: sweeping a plurality of candidate reception beams to receive the one or more first reference signals and the one or more second reference signals.

Aspect 10: The method of any of aspects 8 through 9, further comprising: determining a first uplink channel response matrix for the first node based at least in part on the one or more first reference signals and a second uplink channel response matrix for the second node based at least in part on the one or more second reference signals; determining an orthogonal projection matrix of the second uplink channel response matrix; determining a projected matrix based at least in part on a projection of the first uplink channel response matrix onto the orthogonal projection matrix; and calculating a major eigen vector of the projected matrix as a beamforming weight vector of the SRS transmission beam.

Aspect 11: The method of any of aspects 1 through 10, wherein the first node comprises a target node with respect to the UE; and the second node comprises a non-target node with respect to the UE.

Aspect 12: The method of any of aspects 1 through 11, further comprising: receiving an uplink scheduling grant that is based at least in part on the transmitted SRS signal.

Aspect 13: The method of any of aspects 1 through 12, wherein the one or more SRS transmission beams are associated with another, previously configured, SRS resource for the first node; wherein the other SRS resource is associated with one or more SRS ports; and wherein each of the one or more SRS ports is associated with a respective SRS transmission beam of the one or more SRS transmission beams Aspect 14: The method of any of aspects 1 through 13, further comprising: determining respective sets of beamforming weights for each of the one or more SRS transmission beams; and generating a reference SRS transmission beam of the one or more SRS transmission beams based at least in part on: a set of beamforming weights for the reference SRS transmission beam, and an SRS port associated with the reference SRS transmission beam.

Aspect 15: The method of any of aspects 1 through 14, wherein determining the SRS transmission beam comprises: determining the SRS transmission beam based at least in part on one or more SRS transmission beam parameters.

Aspect 16: The method of aspect 15, wherein the one or more SRS transmission beam parameters comprise a first parameter indicating that a beam correlation between the SRS transmission beam and a reference SRS transmission beam of the one or more SRS transmission beams is to satisfy a beam correlation threshold; and a second parameter indicating that the SRS transmission beam is to generate zero interference strength on access links associated with one or more non-target TRPs.

Aspect 17: The method of aspects 15, wherein the one or more SRS transmission beam parameters comprise a first parameter indicating that a beam correlation between the SRS transmission beam and a reference SRS transmission beam of the one or more SRS transmission beams is to satisfy a beam correlation threshold; and a second parameter indicating an interference strength of the SRS transmission beam for access links associated with one or more non-target TRPs that satisfies an interference strength threshold.

Aspect 18: The method of any of aspects 1 through 17, wherein determining the SRS transmission beam comprises: determining respective correlation coefficients between one or more reference SRS transmission beams and the one or more SRS transmission beams; determining one or more downlink beams based on the one or more reference SRS transmission beams; sweeping the one or more downlink beams to receive one or more reference signals; determining respective beamformed downlink channel gains for each of the one or more downlink beams based at least in part on the one or more reference signals; determining respective uplink interference strengths for the one or more reference SRS transmission beams based at least in part on: the respective beamformed downlink channel gains, and reciprocity between the one or more reference SRS transmission beams and the one or more downlink beams; and determining the SRS transmission beam based at least in part on the respective uplink interference strengths and the respective correlation coefficients.

Aspect 19: A method for wireless communications at a base station, comprising:
transmitting an SRS configuration message that indicates one or more first reference signals from a first node or one or more SRS transmission beams associated with the first node and one or more second reference signals from a second node; and receiving, from a UE, an SRS signal using an SRS transmission beam that is based at least in part on a procedure for determining the SRS transmission beam, the one or more first reference signals, and the one or more second reference signals.

Aspect 20: The method of aspect 19, further comprising: transmitting an indication of the procedure for determining the SRS transmission beam.

Aspect 21: The method of any of aspects 19 through 20, wherein the procedure for determining the SRS transmission beam comprises: determining that the SRS transmission beam maximizes an uplink channel gain on an uplink channel between the UE and the first node and generates zero interference on an uplink channel between the UE and the second node.

Aspect 22: The method of any of aspects 19 through 20, wherein the procedure for determining the SRS transmission beam comprises: determining that the SRS transmission beam maximizes a ratio of an uplink channel gain on an uplink channel between the UE and the first node and an interference on an uplink channel between the UE and the second node.

Aspect 23: The method of any of aspects 19 through 22, wherein the SRS configuration message indicates an identity of a resource associated with the one or more first reference signals, the one or more second reference signals, or both.

Aspect 24: The method of any of aspects 19 through 23, wherein the SRS configuration message is transmitted via radio resource control signaling, a medium access control layer control element, a downlink control information message, or a combination thereof.

Aspect 25: The method of any of aspects 19 through 24, wherein the one or more first reference signals or the one or more second reference signals comprise channel state information reference signals, synchronization signal block reference signals, demodulation reference signals, or a combination thereof.

Aspect 26: The method of any of aspects 19 through 25, further comprising: transmitting an uplink scheduling grant that is based at least in part on the SRS signal.

Aspect 27: The method of any of aspects 19 through 26, wherein the one or more SRS transmission beams are associated with another, previously configured, SRS resource for the first node; wherein the other SRS resource is associated with one or more SRS ports; and wherein each of the one or more SRS ports is associated with a respective SRS transmission beam of the one or more SRS transmission beams Aspect 28: The method of any of aspects 19 through 27, further comprising: determining the SRS transmission beam based at least in part on one or more SRS transmission beam parameters.

Aspect 29: An apparatus for wireless communications at a UE, comprising a processor; memory coupled with the processor; and instructions stored in the memory and executable by the processor to cause the apparatus to perform a method of any of aspects 1 through 18.

Aspect 30: An apparatus for wireless communications at a UE, comprising at least one means for performing a method of any of aspects 1 through 18.

Aspect 31: A non-transitory computer-readable medium storing code for wireless communications at a UE, the code comprising instructions executable by a processor to perform a method of any of aspects 1 through 18.

Aspect 32: An apparatus for wireless communications at a base station, comprising a processor; memory coupled with the processor; and instructions stored in the memory and executable by the processor to cause the apparatus to perform a method of any of aspects 19 through 28.

Aspect 33: An apparatus for wireless communications at a base station, comprising at least one means for performing a method of any of aspects 19 through 28.

Aspect 34: A non-transitory computer-readable medium storing code for wireless communications at a base station, the code comprising instructions executable by a processor to perform a method of any of aspects 19 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving a sounding reference signal (SRS) configuration message that indicates one or more first reference signals from a first node or one or more SRS transmission beams associated with the first node and one or more second reference signals from a second node;
   determining an SRS transmission beam for transmitting an SRS signal based at least in part on a first SRS transmission beam parameter, a procedure for determining the SRS transmission beam, the one or more first reference signals, and the one or more second reference signals, wherein the first SRS transmission beam parameter indicates a beam correlation threshold, and wherein a beam correlation between the determined SRS transmission beam and a reference SRS transmission beam of the one or more SRS transmission beams associated with the first node satisfies the beam correlation threshold; and
   transmitting the SRS signal using the SRS transmission beam.

2. The method of claim 1, further comprising:
   receiving an indication of the procedure for determining the SRS transmission beam.

3. The method of claim 1, wherein the procedure for determining the SRS transmission beam comprises:
   determining that the SRS transmission beam maximizes an uplink channel gain on an uplink channel between the UE and the first node and generates zero interference on an uplink channel between the UE and the second node.

4. The method of claim 1, wherein the procedure for determining the SRS transmission beam comprises:
   determining that the SRS transmission beam maximizes a ratio of an uplink channel gain on an uplink channel between the UE and the first node and an interference on an uplink channel between the UE and the second node.

5. The method of claim 1, wherein the SRS configuration message indicates an identity of a resource associated with the one or more first reference signals, the one or more second reference signals, or both.

6. The method of claim 1, wherein the SRS configuration message is received via radio resource control signaling, a medium access control layer control element, a downlink control information message, or a combination thereof.

7. The method of claim 1, wherein the one or more first reference signals or the one or more second reference signals comprise channel state information reference signals, synchronization signal block reference signals, demodulation reference signals, or a combination thereof.

8. The method of claim 1, further comprising:
   receiving the one or more first reference signals from the first node; and
   receiving the one or more second reference signals from the second node.

9. The method of claim 8, further comprising:
sweeping a plurality of candidate reception beams to receive the one or more first reference signals and the one or more second reference signals.

10. The method of claim 8, further comprising:
determining a first uplink channel response matrix for the first node based at least in part on the one or more first reference signals and a second uplink channel response matrix for the second node based at least in part on the one or more second reference signals;
determining an orthogonal projection matrix of the second uplink channel response matrix;
determining a projected matrix based at least in part on a projection of the first uplink channel response matrix onto the orthogonal projection matrix; and
calculating a major eigen vector of the projected matrix as a beamforming weight vector of the SRS transmission beam.

11. The method of claim 1, wherein:
the first node comprises a target node with respect to the UE; and
the second node comprises a non-target node with respect to the UE.

12. The method of claim 1, further comprising:
receiving an uplink scheduling grant that is based at least in part on the transmitted SRS signal.

13. The method of claim 1, wherein:
the one or more SRS transmission beams are associated with a previously configured SRS resource for the first node,
the previously configured SRS resource is associated with one or more SRS ports, and
each of the one or more SRS ports is associated with a respective SRS transmission beam of the one or more SRS transmission beams.

14. The method of claim 1, further comprising:
determining respective sets of beamforming weights for each of the one or more SRS transmission beams; and
generating the reference SRS transmission beam of the one or more SRS transmission beams based at least in part on:
  a set of beamforming weights for the reference SRS transmission beam, and
  an SRS port associated with the reference SRS transmission beam.

15. The method of claim 1, wherein determining the SRS transmission beam comprises:
determining the SRS transmission beam based at least in part on one or more SRS transmission beam parameters, the one or more SRS transmission beam parameters comprising at least the first SRS transmission beam parameter.

16. The method of claim 15, wherein the one or more SRS transmission beam parameters comprise:
a second parameter indicating that the SRS transmission beam is to generate zero interference strength on access links associated with one or more non-target transmission and reception points (TRPs).

17. The method of claim 15, wherein the one or more SRS transmission beam parameters comprise:
a second parameter indicating an interference strength of the SRS transmission beam for access links associated with one or more non-target transmission and reception points (TRPs) that satisfies an interference strength threshold.

18. The method of claim 1, wherein determining the SRS transmission beam comprises:
determining respective correlation coefficients between one or more reference SRS transmission beams and the one or more SRS transmission beams;
determining one or more downlink beams based on the one or more reference SRS transmission beams;
sweeping the one or more downlink beams to receive one or more reference signals;
determining respective beamformed downlink channel gains for each of the one or more downlink beams based at least in part on the one or more reference signals;
determining respective uplink interference strengths for the one or more reference SRS transmission beams based at least in part on:
  the respective beamformed downlink channel gains, and
  reciprocity between the one or more reference SRS transmission beams and the one or more downlink beams; and
determining the SRS transmission beam based at least in part on the respective uplink interference strengths and the respective correlation coefficients.

19. A method for wireless communications at a network entity, comprising:
transmitting a sounding reference signal (SRS) configuration message that indicates one or more first reference signals from a first node or one or more SRS transmission beams associated with the first node and one or more second reference signals from a second node; and
receiving, from a user equipment (UE), an SRS signal using an SRS transmission beam that is based at least in part on a first SRS transmission beam parameter, a procedure for determining the SRS transmission beam, the one or more first reference signals, and the one or more second reference signals, wherein the first SRS transmission beam parameter indicates a beam correlation threshold, and wherein a beam correlation between the SRS transmission beam and a reference SRS transmission beam of the one or more SRS transmission beams associated with the first node satisfies the beam correlation threshold.

20. The method of claim 19, further comprising:
transmitting an indication of the procedure for determining the SRS transmission beam.

21. The method of claim 19, wherein the procedure for determining the SRS transmission beam comprises:
determining that the SRS transmission beam maximizes an uplink channel gain on an uplink channel between the UE and the first node and generates zero interference on an uplink channel between the UE and the second node.

22. The method of claim 19, wherein the procedure for determining the SRS transmission beam comprises:
determining that the SRS transmission beam maximizes a ratio of an uplink channel gain on an uplink channel between the UE and the first node and an interference on an uplink channel between the UE and the second node.

23. The method of claim 19, wherein the SRS configuration message indicates an identity of a resource associated with the one or more first reference signals, the one or more second reference signals, or both.

24. The method of claim 19, wherein the SRS configuration message is transmitted via radio resource control signaling, a medium access control layer control element, a downlink control information message, or a combination thereof.

25. The method of claim 19, wherein the one or more first reference signals or the one or more second reference signals comprise channel state information reference signals, synchronization signal block reference signals, demodulation reference signals, or a combination thereof.

26. The method of claim 19, further comprising:
transmitting an uplink scheduling grant that is based at least in part on the SRS signal.

27. The method of claim 19, wherein:
the one or more SRS transmission beams are associated with a previously configured SRS resource for the first node,
the previously configured SRS resource is associated with one or more SRS ports, and
each of the one or more SRS ports is associated with a respective SRS transmission beam of the one or more SRS transmission beams.

28. The method of claim 19, further comprising:
determining the SRS transmission beam based at least in part on one or more SRS transmission beam parameters.

29. A user equipment (UE) for wireless communications, comprising:
one or more memories storing processor-executable code; and
one or more processors coupled with the one or more memories and individually or collectively operable to execute the code to cause the UE to:
receive a sounding reference signal (SRS) configuration message that indicates one or more first reference signals from a first node or one or more SRS transmission beams associated with the first node and one or more second reference signals from a second node;
determine an SRS transmission beam for transmitting an SRS signal based at least in part on a first SRS transmission beam parameter, a procedure for determining the SRS transmission beam, the one or more first reference signals, and the one or more second reference signals, wherein the first SRS transmission beam parameter indicates a beam correlation threshold, and wherein a beam correlation between the determined SRS transmission beam and a reference SRS transmission beam of the one or more SRS transmission beams associated with the first node satisfies the beam correlation threshold; and
transmit the SRS signal using the SRS transmission beam.

30. A network entity for wireless communications, comprising:
one or more memories storing processor-executable code; and
one or more processors coupled with the one or more memories and individually or collectively operable to execute the code to cause the network entity to:
transmit a sounding reference signal (SRS) configuration message that indicates one or more first reference signals from a first node or one or more SRS transmission beams associated with the first node and one or more second reference signals from a second node; and
receive, from a user equipment (UE), an SRS signal using an SRS transmission beam that is based at least in part on a first SRS transmission beam parameter, a procedure for determining the SRS transmission beam, the one or more first reference signals, and the one or more second reference signals, wherein the first SRS transmission beam parameter indicates a beam correlation threshold, and wherein a beam correlation between the SRS transmission beam and a reference SRS transmission beam of the one or more SRS transmission beams associated with the first node satisfies the beam correlation threshold.

* * * * *